US011968236B2

(12) United States Patent
Rogers et al.

(10) Patent No.: US 11,968,236 B2
(45) Date of Patent: Apr. 23, 2024

(54) EVENT-LEVEL DATA PRIVACY FOR STREAMING POST ANALYTICS DATA

(71) Applicant: Microsoft Technology Licensing, LLC, Redmond, WA (US)

(72) Inventors: Ryan M. Rogers, Los Gatos, CA (US); Subbu Subramaniam, Sunnyvale, CA (US); Mark B. Cesar, Oakland, CA (US); Adrian Rivera Cardoso, San Francisco, CA (US); Yu Chen, San Jose, CA (US); Jefferson Lai, Seattle, WA (US); Vinyas Maddi, San Jose, CA (US); Lin Xu, Fremont, CA (US); Gavin Castro Uathavikul, Sausalito, CA (US); Neha Jain, San Jose, CA (US); Shraddha Sahay, Newark, CA (US); Parvez Ahammad, San Jose, CA (US); Rahul Tandra, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 17/709,318

(22) Filed: Mar. 30, 2022

(65) Prior Publication Data

US 2023/0319110 A1    Oct. 5, 2023

(51) Int. Cl.
*H04L 9/40* (2022.01)
(52) U.S. Cl.
CPC .................................. *H04L 63/20* (2013.01)

(58) Field of Classification Search
CPC ....................................................... H04L 63/20
See application file for complete search history.

(56) References Cited

U.S. PATENT DOCUMENTS

| 7,424,426 B2 | 9/2008 | Furui et al. |
| 8,601,024 B2 | 12/2013 | Kenthapadi et al. |
| 8,627,488 B2 | 1/2014 | Cormode et al. |
| 2010/0094758 A1 | 4/2010 | Chamberlain |
| 2011/0208763 A1 | 8/2011 | Mcsherry et al. |

(Continued)

OTHER PUBLICATIONS

Krishnaram Kenthapadi et al. PriPeARL: A Framework for Privacy-Preserving Analytics and Reporting at LinkedIn. (Year: 2018).*

(Continued)

*Primary Examiner* — Bryan Y Lee
(74) *Attorney, Agent, or Firm* — NICHOLSON DE VOS WEBSTER & ELLIOTT LLP

(57) ABSTRACT

Technologies for providing event-level data privacy for streaming post analytics data include, in some embodiments, receiving a data stream that includes instances of count data collected over a time interval, computing a true count breakdown that includes a set of sub-counts of non-public user interface interactions on the post, creating a noisy count breakdown by applying at least one differential privacy mechanism to the set of sub-counts, and streaming the noisy count breakdown instead of the true count breakdown to a computing device. At least one of the sub-counts is a count that is associated with a particular value of an attribute that has different possible values. The attribute is associated with the non-public user interface interactions on the post.

15 Claims, 9 Drawing Sheets

(56) References Cited

U.S. PATENT DOCUMENTS

| | | | |
|---|---|---|---|
| 2013/0145473 | A1 | 6/2013 | Cormode et al. |
| 2017/0109544 | A1 | 4/2017 | Chen et al. |
| 2017/0169253 | A1 | 6/2017 | Curcio et al. |
| 2017/0235974 | A1 | 8/2017 | Zhang et al. |
| 2017/0371925 | A1 | 12/2017 | Arya |
| 2018/0239925 | A1 | 8/2018 | Nerurkar et al. |
| 2019/0065775 | A1 | 2/2019 | Klucar et al. |
| 2022/0366299 | A1 | 11/2022 | Sinha |

OTHER PUBLICATIONS

Zhu, et al., "Federated Heavy Hitters Discovery with Differential Privacy", In Repository of arXiv:1902.08534v1, Feb. 22, 2019, 17 Pages.

Rogers, et al., "A Members First Approach to Enabling LinkedIn's Labor Market Insights at Scale", In Repository of arXiv:2010.13981v1, Oct. 27, 2020, 8 Pages.

Rogers, et al., "Asymptotically Truthful Equilibrium Selection in Large Congestion Games", In Proceedings of the Fifteenth ACM Conference on Economics and Computation, Jun. 8, 2014, pp. 771-782.

Rogers, et al., "LinkedIn's Audience Engagements API: A Privacy Preserving Data Analytics System at Scale", In Repository of arXiv:2002.05839v3, Nov. 16, 2020, 28 Pages.

Smith, et al., "(Nearly) Optimal Algorithms for Private Online Learning in Full-information and Bandit Settings", In Proceedings of Advances in Neural Information Processing Systems, vol. 26, Dec. 5, 2013, 9 Pages.

Vadhan, Salil, "The Complexity of Differential Privacy", In Book of Tutorials on the Foundations of Cryptography, 2017, pp. 347-450.

Wilson, et al., "Differentially Private SQL with Bounded User Contribution", In Proceedings on Privacy Enhancing Technologies vol. 2020, No. 2, May 8, 2020, pp. 230-250.

Zeng, et al., "On Differentially Private Frequent Itemset Mining", In Proceedings of the VLDB Endowment, vol. 6, Issue 1, Nov. 1, 2012, pp. 25-36.

"Latanya Sweeney—Wikipedia", Retrieved From: https://web.archive.org/web/20210413202508/https://en.wikipedia.org/wiki/Latanya_Sweeney, Apr. 13, 2021, 3 Pages.

"Learning with Privacy at Scale", Retrieved From: https://machinelearning.apple.com/research/learning-with-privacy-at-scale, Dec. 2017, 8 Pages.

"Non Final Office Action Issued in U.S. Appl. No. 16/527,987", dated Apr. 12, 2021, 8 Pages.

"Notice of Allowance Issued in U.S. Appl. No. 16/527,987", dated Jul. 21, 2021, 11 Pages.

Bafna, et al., "The Price of Selection in Differential Privacy", In Proceedings of the 30th Conference on Learning Theory, PMLR, Jul. 7, 2017, 18 Pages.

Bassily, et al., "Local, Private, Efficient Protocols for Succinct Histograms", In Proceedings of the 47th ACM Symposium on Theory of Computing, Jun. 14, 2015, pp. 127-135.

Bassily, et al., "Practical Locally Private Heavy Hitters", In Proceedings of Advances in Neural Information Processing Systems, vol. 30, Dec. 4, 2017, 9 Pages.

Bhaskar, et al., "Discovering Frequent Patterns in Sensitive Data", In Proceedings of the 16th ACM SIGKDD International Conference on Knowledge Discovery and Data Mining, Jul. 25, 2010, pp. 503-512.

Bun, et al., "Concentrated Differential Privacy: Simplifications, Extensions, and Lower Bounds", In Proceedings of 14th International Conference on Theory of Cryptography (TCC), Nov. 1, 2016, pp. 635-658.

Bun, et al., "Simultaneous Private Learning of Multiple Concepts", In Proceedings of 7th ACM Conference on Innovations in Theoretical Computer Science (ITCS), Jan. 14, 2016, pp. 369-380.

Canonne, et al., "The Discrete Gaussian for Differential Privacy", In Journal of Advances in Neural Information Processing Systems, vol. 33, Dec. 6, 2020, 13 Pages.

Cardoso, et al., "Differentially Private Histograms under Continual Observation: Streaming Selection into the Unknown", In Repository of arXiv:2103.16787v2, Jan. 4, 2022, 35 Pages.

Cardoso, et al., "Differentially Private Online Submodular Minimization", In Proceedings of the 22nd International Conference on Artificial Intelligence and Statistics, Apr. 16, 2019, 9 Pages.

Cesar, et al., "Bounding, Concentrating, and Truncating: Unifying Privacy Loss Composition for Data Analytics", In Proceedings of the 32nd International Conference on Algorithmic Learning Theory, Mar. 16, 2021, 38 Pages.

Chan, et al., "Differentially Private Continual Monitoring of Heavy Hitters from Distributed Streams", In Proceedings of 12th International Symposium on Privacy Enhancing Technologies Symposium (PETS), Jul. 11, 2012, pp. 140-159.

Chan, et al., "Private and Continual Release of Statistics", In Journal of ACM Transactions on Information and System Security (TISSEC), vol. 14, No. 3, Article 26, Nov. 1, 2011, 24 Pages.

Ding, et al., "Collecting Telemetry Data Privately", In Proceedings of the Conference on Neural Information Processing Systems, vol. 30, Dec. 4, 2017, 10 Pages.

Durand, et al., "Loglog Counting of Large Cardinalities", In Proceedings of European Symposium on Algorithms, Sep. 16, 2003, pp. 605-617.

Durfee, et al., "Practical Differentially Private Top-k Selection with Pay-What-you-Get Composition", In Repository of arXiv:1905.04273v2, Sep. 18, 2019, 47 Pages.

Dwork, et al., "Boosting and Differential Privacy", In Proceedings of the IEEE 51st Annual Symposium on Foundations of Computer Science, Oct. 23, 2010, pp. 51-60.

Dwork, et al., "Calibrating Noise to Sensitivity in Private Data Analysis", In Proceedings of the Third Conference on Theory of Cryptography, Mar. 4, 2006, pp. 265-284.

Dwork, et al., "Concentrated Differential Privacy", In Repository of arXiv:1603.01887v2, Mar. 16, 2016, 28 Pages.

Dwork, et al., "Differential Privacy Under Continual Observation", In Proceedings of the Forty-Second ACM Symposium on Theory of Computing, Jun. 5, 2010, pp. 715-724.

Dwork, et al., "Differentially Private False Discovery Rate Control", In Repository of arXiv:1807.04209v1, Jul. 11, 2018, 43 Pages.

Dwork, et al., "On the Complexity of Differentially Private Data Release: Efficient Algorithms and Hardness Results", In Proceedings of the forty-first Annual ACM Symposium on Theory of Computing, May 31, 2009, pp. 381-390.

Dwork, et al., "Our Data, Ourselves: Privacy via Distributed Noise Generation", In Proceedings of Annual International conference on the theory and applications of cryptographic techniques, May 28, 2006, pp. 486-503.

Dwork, et al., "Pan-Private Streaming Algorithms", In Proceedings of Innovations in Computer Science (ICS), Jan. 5, 2010, pp. 66-80.

Dwork, et al., "Private False Discovery Rate Control", In Repository of arXiv:1511.03803v1, Nov. 12, 2015, 23 Pages.

Dwork, et al., "The Algorithmic Foundations of Differential Privacy", In Journal Foundations and Trends in Theoretical Computer Science, vol. 9, Issue 3-4, Aug. 11, 2014, 281 Pages.

Erlingsson, et al., "Rappor: Randomized Aggregatable Privacy-Preserving Ordinal Response", In Proceedings of the ACM SIGSAC Conference on Computer and Communications Security, Nov. 3, 2014, pp. 1054-1067.

Fanti, et al., "Building a Rappor with the Unknown: Privacy-Preserving Learning of Associations and Data Dictionaries", In Proceedings of the Privacy Enhancing Technologies, vol. 3, Jul. 1, 2016, pp. 41-61.

Hsu, et al., "Private Matchings and Allocations", In Proceedings of the forty-sixth annual ACM Symposium on Theory of Computing, May 31, 2014, pp. 21-30.

Ilyas, et al., "A Survey of Top-k Query Processing Techniques in Relational Database Systems", In Proceedings of ACM Computing Surveys, vol. 40, Issue 4, Oct. 1, 2008, 58 Pages.

Jain, et al., "The Price of Differential Privacy under Continual Observation", In Repository of arXiv:2112.00828v2, Dec. 8, 2021, 28 Pages.

(56) References Cited

OTHER PUBLICATIONS

Johnson, et al., "Towards Practical Differential Privacy for SQL Queries", In Proceedings of the VLDB Endowment, vol. 11, No. 5, Jan. 1, 2018, pp. 526-539.

Kairouz, et al., "The Composition Theorem for Differential Privacy", In Journal of IEEE Transactions on Information Theory, vol. 63, Issue 6, Jun. 2015, pp. 4037-4049.

Kantarcioğlu, et al., "When do Data Mining Results Violate Privacy?", In Proceedings of the Tenth ACM SIGKDD International Conference on Knowledge Discovery and Data Mining, Aug. 22, 2004, pp. 599-604.

Kenthapadi, et al., "A Framework for Privacy-Preserving Analytics and Reporting at Linkedin", In Proceedings of the 27th ACM International Conference on Information and Knowledge Management, CIKM, Oct. 22, 2018, pp. 2183-2191.

Kifer, et al., "Guidelines for Implementing and Auditing Differentially Private Systems", In Repository of arXiv:2002.04049v2, May 12, 2020, 32 Pages.

Korolova, et al., "Releasing Search Queries and Clicks Privately", In Proceedings of the 18th International Conference on World Wide Web (WWW), Apr. 20, 2009, pp. 171-180.

Lee, et al., "Top-k Frequent Itemsets via Differentially Private FP-Trees", Proceedings of the 20th ACM SIGKDD International Conference on Knowledge Discovery and Data Mining, Aug. 24, 2014, pp. 931-940.

Li, et al., "PrivBasis: Frequent Itemset Mining with Differential Privacy", In Proceedings of the VLDB Endowment, vol. 5, No. 11, Aug. 27, 2012, pp. 1340-1351.

Lyu, et al., "Understanding the Sparse Vector Technique for Differential Privacy", In Proceedings of the VLDB Endowment, vol. 10, No. 6, Feb. 1, 2017, pp. 637-648.

Machanavajjhala, et al., "L-Diversity: Privacy Beyond k-Anonymity", In Proceedings of ACM Transactions on Knowledge Discovery from Data, vol. 1, Issue 1, Mar. 1, 2007, 52 Pages.

McSherry, et al., "Mechanism Design via Differential Privacy", In Proceedings of 48th Annual IEEE Symposium on Foundations of Computer Science, Oct. 21, 2007, 10 Pages.

Mir, et al., "Pan-Private Algorithms via Statistics on Sketches", In Proceedings of the thirtieth ACM SIGMOD-SIGACT-SIGART Symposium on Principles of Database Systems, Jun. 13, 2011, pp. 37-48.

Murtagh, et al., "The Complexity of Computing the Optimal Composition of Differential Privacy", In Proceedings of Theory of Cryptography Conference, vol. 9562, Nov. 1, 2016, pp. 157-175.

Qardaji, et al., "Understanding Hierarchical Methods for Differentially Private Histograms", In Proceedings of the VLDB Endowment, vol. 6, Issue 14, Sep. 1, 2013, pp. 1954-1965.

Roch, Sebastien, "Notes 20 : Azuma's Inequality", Retrieved From: https://web.archive.org/web/20220121052209/https://people.math.wisc.edu/~roch/grad-prob/gradprob-notes20.pdf, Jan. 21, 2022, 11 Pages.

Dajani, et al., "The Modernization of Statistical Disclosure Limitation at the US Census Bureau", Retrieved From: https://www2.census.gov/cac/sac/meetings/2017-09/statistical-disclosure-limitation.pdf, Sep. 2017, 12 Pages.

"Objective-Collapse Theory", Retrieved from: https://web.archive.org/web/20220407194925/https://en.wikipedia.org/wiki/Objective-collapse_theory, Feb. 23, 2022, 9 Pages.

"Superposition Principle", Retrieved from: https://web.archive.org/web/20220417011530/https://en.wikipedia.org/wiki/Superposition_principle, Mar. 11, 2022, 8 Pages.

Non-Final Office Action dated Jan. 19, 2024, in U.S. Appl. No. 17/972,408, 13 pages.

\* cited by examiner

FIG. 4A

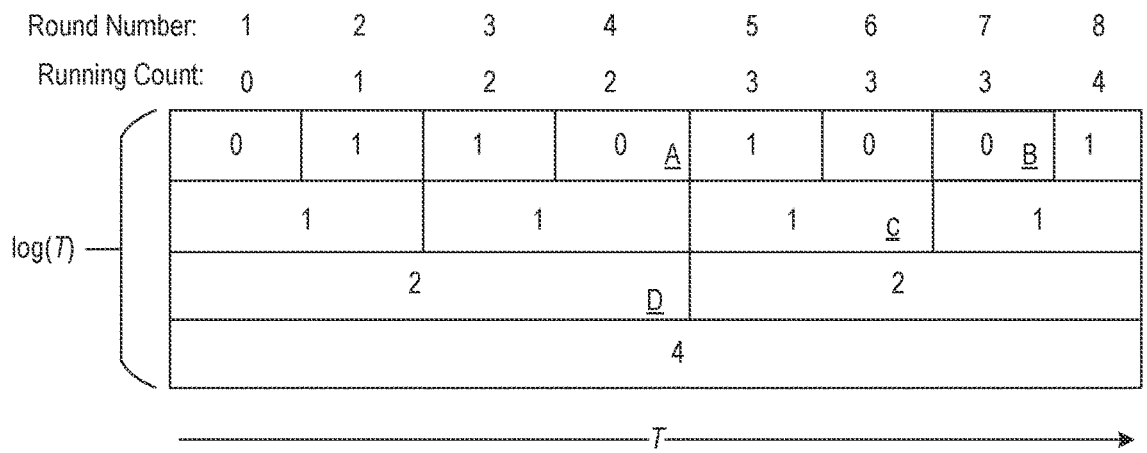

FIG. 4B

Unknown Base Mechanism

Parameters:
- $r$: log base (integer greater than or equal to 2)
- $\tau$: standard deviation of noise used (positive real value)
- $\delta$: failure probability (positive real value less than 1)
- $T$: maximum length of the stream (positive integer)

Input: a stream $\omega_1, \omega_2, \cdots, \omega_T$ of items where each $\omega_t$ for $t \in [T]$ is a collection of at most $\Delta$ items from a domain $U$.

Algorithm:
At round $t \leq T$, write the sequence of items that exist in the stream $\omega_1, \cdots, \omega_t$ up to round $t$ as a series of bit sequences $\sigma_1[i], \sigma_2[i], \cdots, \sigma_t[i] \in \{0,1\}$ for the top-$i$ count in $\omega_1, \cdots, \omega_t$.
- Use Base Mechanism with sequence $\sigma_1[i], \sigma_2[i], \cdots, \sigma_t[i] \in \{0,1\}$ for each item $i$. The count returned by Base Mechanism is referred to as $\hat{h}_t[i]$.
- If $\hat{h}_t[i] > \tau L_r \sqrt{r-1}\, \Phi^{-1}\left(1 - \frac{\delta}{T}\right) + 1$, where $L_r = \lceil \log_r T \rceil$ and $\Phi(\cdot)$ is the cumulative distribution function for a standard normal, then return $\hat{h}_t[i]$ as well as the label for item $i$. Otherwise, do not return $\hat{h}_t[i]$.

FIG. 4C

Sparse Gumbel Mechanism

Parameters:
- $r$: log base (integer bigger or equal to 2)
- $\tau$: standard deviation of noise used (positive real value)
- $k$: top-$k$ to return each round (positive integer).
- $s$: maximum number of switches, that is the number of times a new top-$k$ is selected (positive integer)
- $T$: maximum length of the stream (positive integer)
- $\eta$: gap between largest count not selected and smallest count selected (positive real value).

Input: a stream $\omega_1, \omega_2, \cdots, \omega_T$ of items where each $\omega_t$ for $t \in [T]$ is a collection of items from a domain $U$ that is known in advance.

Algorithm:
At round $t \leq T$, will write the sequence of items that exist in the stream $\omega_1, \cdots, \omega_t$ up to round $t$ as a series of bit sequences $\sigma_1[i], \sigma_2[i], \cdots, \sigma_t[i] \in \{0,1\}$ for the top-$i$ count in $\omega_1, \cdots, \omega_t$ for all items in $U$, including if an item is not present in $\omega_1, \cdots, \omega_t$, in which case its count would be zero.

1. If there is no currently top-$k$ set of items are selected, run the Known Gumbel algorithm to select the noisy top-$k$ on aggregated counts on the sequence $\omega_1, \cdots, \omega_t$. Call this set of $k$ elements that is returned as $\{i_1, i_2, \cdots, i_k\}$.
   - Sample $Z$ from a Laplace distribution with mean 0 and scale parameter $\tau$
   - Return the resulting output of Known Gumbel.
2. Use Base Mechanism with sequence $\sigma_1[i], \sigma_2[i], \cdots, \sigma_t[i] \in \{0,1\}$ for each item $i \in \{i_1, \cdots, i_k\}$ in the currently selected top-$k$. The count returned by Base Mechanism is referred to as $\tilde{h}_t[i]$ for each item $i \in \{i_1, \cdots, i_k\}$.
3. Let $\tilde{h}_t[min]$ be the smallest count, so that $\tilde{h}_t[min] \leq \tilde{h}_t[i]$ for all item $i \in \{i_1, \cdots, i_k\}$.
4. From $\omega_1, \cdots, \omega_t$ select the largest count from elements that are not currently selected, that is select largest count that is not in $\{i_1, \cdots, i_k\}$. Call this count $y_t$.
5. Sample $Z_t$ from a Laplace distribution with mean zero and standard deviation $2\tau$
   - If $y_t + Z_t > \tilde{h}_t[min] + Z + \eta$: go to step 1, with no currently selected top-$k$ elements.
   - Otherwise return $\tilde{h}_t[i]$ for each item $i \in \{i_1, \cdots, i_k\}$.

FIG. 4D

Sparse Unknown Gumbel Mechanism

Parameters:
- $r$: log base (integer bigger or equal to 2)
- $\tau$: standard deviation of noise used (positive real value)
- $k$: top-k to return each round (positive integer).
- $\bar{k}$: maximum number of elements for which counts are fetched at each round (integer larger than $k$).
- $s$: maximum number of switches, that is the number of times a new top-k is selected (positive integer)
- $T$: maximum length of the stream (positive integer)
- $\delta$: failure probability (positive real value less than 1)
- $\eta$: gap between largest count not selected and smallest count selected (positive real value).

Input: a stream $\omega_1, \omega_2, \cdots, \omega_T$ of items where each $\omega_t$ for $t \in [T]$ is a collection of items from a domain $U$ that is known in advance.

Algorithm:
At round $t \leq T$, write the sequence of items that exist in the stream $\omega_1, \cdots, \omega_t$ up to round $t$ as a series of bit sequences $\sigma_1[i], \sigma_2[i], \cdots, \sigma_t[i] \in \{0,1\}$ for the top-$i$ count in $\omega_1, \cdots, \omega_t$ for all items in $U$, including if an item is not present in $\omega_1, \cdots, \omega_t$, in which case its count would be zero.

1. If there is no currently top- at most $k$ set of items are selected, run the Unknown Gumbel algorithm to select the noisy top- at most $k$ on aggregated counts on the sequence $\omega_1, \cdots, \omega_t$. Call this set of at most $k$ elements that is returned as $\{i_1, i_2, \cdots, i_k\}$.
   - Sample $Z$ from a Laplace distribution with mean 0 and scale parameter $\tau$
   - Return the resulting output of Known Gumbel.
2. Use Base Mechanism with sequence $\sigma_1[i], \sigma_2[i], \cdots, \sigma_t[i] \in \{0,1\}$ for each item $i \in \{i_1, \cdots, i_k\}$ in the currently selected top-$k$. The count returned by Base Mechanism is referred to as $\tilde{h}_t[i]$ for each item $i \in \{i_1, \cdots, i_k\}$.
3. Let $\tilde{h}_t[\min]$ be the smallest count, so that $\tilde{h}_t[\min] \leq \tilde{h}_t[i]$ for all item $i \in \{i_1, \cdots, i_k\}$.
4. From $\omega_1, \cdots, \omega_t$ select the largest count from elements that are not currently selected, that is select largest count that is not in $\{i_1, \cdots, i_k\}$. Call this count $y_t$.
5. Sample $Z_t$ from a Laplace distribution with mean zero and standard deviation $2\tau$
   - If $y_t + Z_t > \tilde{h}_t[\min] + Z + \eta$, go to step 1. with no currently selected top- at most $k$ elements.
   - Otherwise return $\tilde{h}_t[i]$ for each item $i \in \{i_1, \cdots, i_k\}$.

FIG. 5

```
┌─────────────────────────────────────────────────────────────────────┐
│ RECEIVE A DATA STREAM THAT INCLUDES INSTANCES OF COUNT DATA, WHERE AN│
│ INSTANCE OF THE COUNT DATA REPRESENTS AN OCCURRENCE OF A USER        │
│ INTERFACE INTERACTION WITH A POST.                                   │
│ 502                                                                  │
└─────────────────────────────────────────────────────────────────────┘
                                    │
                                    ▼
┌─────────────────────────────────────────────────────────────────────┐
│ USING THE COUNT DATA, COMPUTE A TRUE COUNT BREAKDOWN THAT INCLUDES,  │
│ FOR THE POST, A SET OF SUB-COUNTS OF NON-PUBLIC USER INTERFACE       │
│ INTERACTIONS ON THE POST, WHERE A SUB-COUNT OF THE SET OF SUB-COUNTS │
│ IS A COUNT ASSOCIATED WITH A PARTICULAR VALUE OF AN ATTRIBUTE THAT HAS│
│ DIFFERENT POSSIBLE VALUES.                                           │
│ 504                                                                  │
└─────────────────────────────────────────────────────────────────────┘
                                    │
                                    ▼
┌─────────────────────────────────────────────────────────────────────┐
│ APPLY AT LEAST ONE DIFFERENTIAL PRIVACY MECHANISM TO THE SET OF SUB- │
│ COUNTS TO PRODUCE A NOISY COUNT BREAKDOWN.                           │
│ 506                                                                  │
└─────────────────────────────────────────────────────────────────────┘
                                    │
                                    ▼
┌─────────────────────────────────────────────────────────────────────┐
│ STREAM THE NOISY COUNT BREAKDOWN INSTEAD OF THE TRUE COUNT           │
│ BREAKDOWN TO A COMPUTING DEVICE ASSOCIATED WITH THE ACCOUNT.         │
│ 508                                                                  │
└─────────────────────────────────────────────────────────────────────┘
```

500

EVENT-LEVEL DATA PRIVACY FOR STREAMING POST ANALYTICS DATA

TECHNICAL FIELD

A technical field to which the present disclosure relates is the computation of streaming post analytics by online systems. Another technical field to which the present disclosure relates is data privacy.

BACKGROUND

Software applications use computer networks to facilitate the distribution of digital content to users of an online system. For example, users can create, share, like, and comment on digital content "posts" in an online system. The performance of a content distribution can be measured based on signals generated at devices of users who receive the content distribution. Examples of signals include views, clicks, likes, comments, and shares. Data associated with these signals can be used to compute performance metrics for a content distribution.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4A is an example of an r-ary table in accordance with some embodiments of the present disclosure.

FIG. 4B, FIG. 4C, and FIG. 4D are examples of data privacy algorithms in accordance with some embodiments of the present disclosure.

FIG. 5 is a flow diagram of an example method for applying data privacy to post analytics in accordance with some embodiments of the present disclosure.

DETAILED DESCRIPTION

Figure 1:
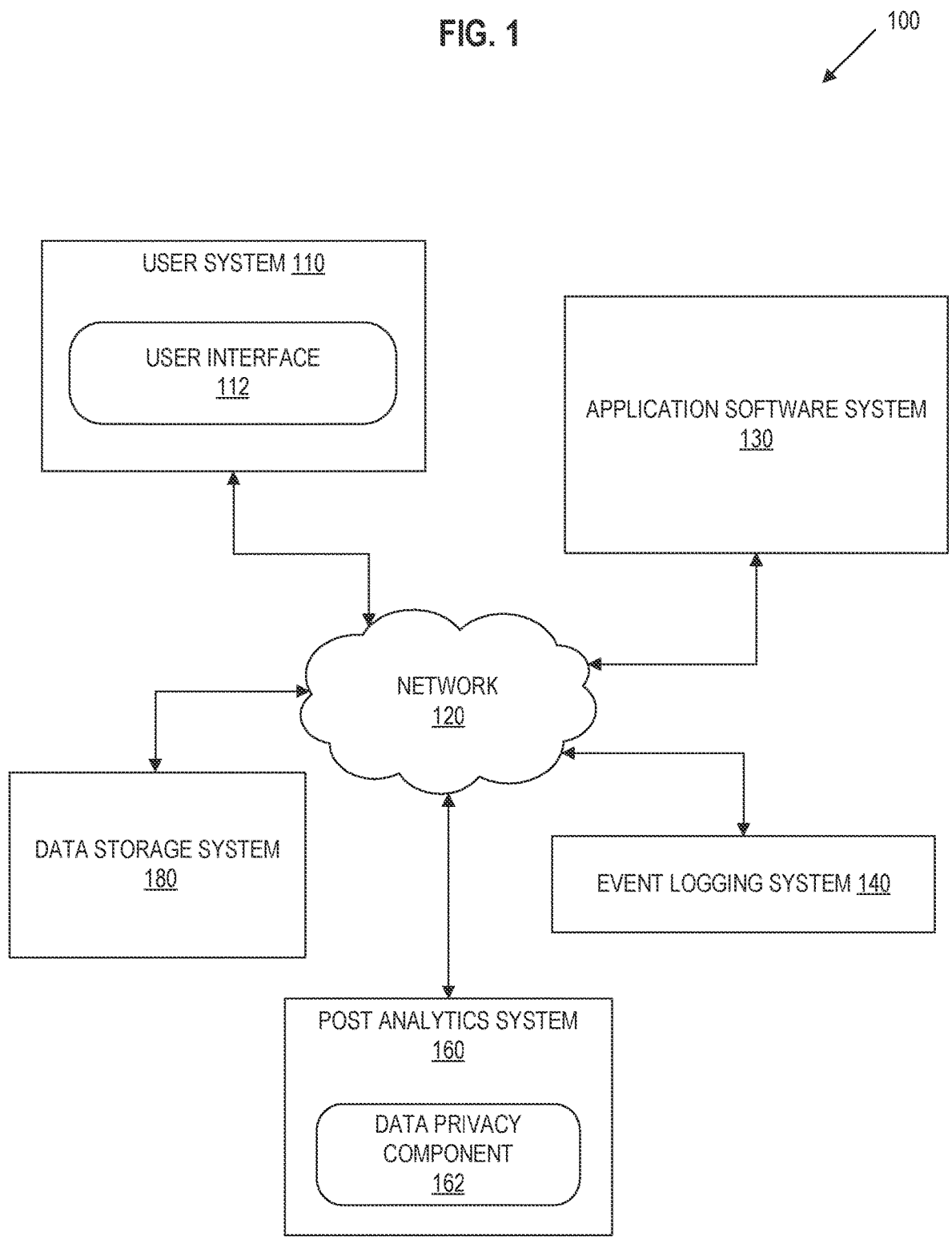
FIG. 1 illustrates an example computing system that includes a post analytics system with a data privacy component, in accordance with some embodiments of the present disclosure.

Aspects of the present disclosure are directed to technologies for applying data privacy to post analytics before the post analytics are provided to the source of the post in an online system.

In one example use case, a user of an online system publishes a digital content item to the user's online social network. For instance, the user posts a comment, status update, graphic or video, or shares a content item originally posted by another user. Other users, such as connections or followers of the user, may see the user's post in their own news feed or may navigate to the user's page to view the post. The online system logs user interface events that reflect interactions of recipient user devices with the post. For example, each time any user views, likes, comments on or shares the post, the online system logs a corresponding event.

A user post is one form of digital content distribution. Other forms of digital content distributions include posts made by digital content distributors, such as advertisers, news organizations, and other business entities. Thus, as used herein, the term post encompasses any form of one-to-many digital content distribution, whether initiated by an individual user or an entity acting as a digital content distributor. Additionally, the form of digital content included in a post or distribution is not limited. Any post or distribution can include text, image, audio, video, or graphical content, or any combination of any of the foregoing.

The online system may generate analytics based on the logged user interface events. For example, the online system may generate running counts of different types of user interface events associated with the post (e.g., 50 views, 20 likes, 2 shares, 5 comments). Events associated with the post may be associated with different users. For example, each user interface event on a post may have been performed by a different user. The running counts are specific to the post and are updated in real-time after each user interface interaction with the post.

The online system may generate an analytic breakdown of a running count of user interface interactions on a particular post. A breakdown includes sub-counts of the running count, where the sub-counts are specific to one or more categories or attribute values, such as job titles, locations, or company names. For example, of the fifty views, twenty of the views were from the San Francisco Bay Area and ten of the views were by users with the title of Software Developer. Since it is a running count, these breakdowns are updated with each new instance of user interface activity on the post. An instance can have a binary value associated with each user account to which the post was distributed; for example, 0 for not viewed at the user account and 1 for viewed at the user account.

These running counts and corresponding analytic breakdowns can be displayed to the user who made the post. For example, the running counts and analytic breakdowns can be streamed to the posting user's device, and the analytics display can be updated on the posting user's device in real time. As a result, these post analytics can provide valuable and timely feedback to the posting user, which can aid the user in creating subsequent posts and communications through the online system.

In some scenarios, the user who made the post may be able to observe incremental changes in the post analytics; for example by continually refreshing their analytics display screen. If these screen refreshes are done frequently enough, a data privacy risk may arise because the posting user may be able to determine with a relatively high level of certainty the moment at which a particular count in a particular analytics breakdown changed.

If a particular count change corresponds to a small group of users, a data privacy risk may arise because the posting user may be able to individually identify the particular user responsible for the count change. For example, if the running count breakdown is updated after a page refresh to include one new view, such that before the page refresh the count did not include the view, the one new view is associated with the attribute values job title=a software developer, employer=LinkedIn, current location=Memphis, Tennessee, and school=Vanderbilt University, and the posting user knows that there is only one such software developer at LinkedIn who has all of those characteristics, the posting user may be able to determine with a high degree of certainty both the identity of the viewing user and the particular moment at which that user viewed the post.

Some types of user interface actions are public while other are non-public. For example, likes, comments, and shares are public actions because those actions are explicitly visible to other users of the online system and the user performing the action knows that other users will be able to see that they performed the action through the online system. Views, on the other hand, may be non-public if the online system does not provide any explicit indication of the views to other users of the online system and the viewing user has the expectation that their individual identity will not be publicly connected with their post views.

For purposes of facilitating interactions between users, some online systems display a signal that indicates to other users that a particular user is currently online. A configurable setting of the online system may allow the user to turn off this feature to prevent other users from knowing precisely when they are online using the online system and when they are not online using the online system.

Online systems have implemented technological measures to ensure that these user-specified privacy preferences and other data privacy requirements are consistently followed. However, other approaches have proven to be very computationally expensive and have struggled with high latency issues, especially when applied to real-time streaming analytics data. Additionally, as described in more detail below, other attempts to apply differential privacy to real-time streaming analytics applications have been shown to be unscalable in terms of privacy loss.

Thus, a technical challenge is to compute and provide post analytics data that is useful and/or valuable to the posting users in a scalable, low-latency way while at the same time ensuring that data privacy requirements are met with respect to the viewing users' non-public actions.

Aspects of the present disclosure address the above and other deficiencies and challenges. As described in more detail below, embodiments provide adaptations of differential privacy mechanisms that are workable in continual observation settings including real-time streaming post analytics scenarios that involve breakdowns with unknown domains and/or unrestricted $l_0$-sensitivity. For example, the adapted differential privacy mechanisms described herein are capable of having the privacy loss increase slower than other approaches for the same number of queries, and in particular, scale well for a large number of actions (e.g., hundreds or thousands of views) on posts.

Embodiments provide an implementation of differential privacy that can be effectively applied to continual data streams of aggregate count data when the count domain is undetermined, such as when labels of all possible values of an attribute (e.g., possible job titles that could be possibly counted) are unknown.

Alternatively or in addition, embodiments provide an implementation of differential privacy that can be effectively applied to continual data streams of aggregate count data when the $l_0$-sensitivity is unrestricted, such as when the number of counts that could possibly be affected by a single user interface action is more than one (e.g., when a viewing user has multiple different current job titles or multiple different skills, the user's view of a post affects the count for each of those different job titles or skills).

The disclosed technologies are described with reference to a use case of generating post analytics for online network-based user-created posts, with a particular focus on the use case of generating continuous post analytics breakdowns for non-public actions where the breakdowns have unknown domains and/or unrestricted $l_0$-sensitivity. In parts of this disclosure, references are made to the specific use case of creating breakdowns of post views. However, the disclosed technologies are not limited to post views but rather are applicable to other types of non-public actions and even may be applied to breakdowns of public actions in other applications in which access to public action analytics needs to be protected or restricted. Additionally, aspects of the disclosed technologies are not limited to online network-based user-generated posts, breakdowns with unknown domains, breakdowns with unrestricted $l_0$-sensitivity, or to non-public actions, but can be used to improve data privacy on streaming analytics more generally.

The disclosed technologies can be described with reference to an example use case of digital content distribution involving a social graph-based application such as a professional social network application. The disclosed technologies are not limited to use in connection with social graph applications but can be used to provide data privacy for content distribution systems more generally. The disclosed technologies can be employed by many different types of network-based applications in which content distribution is provided, including but not limited to various types and forms of application software systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes a data privacy component in accordance with some embodiments of the present disclosure.

In the embodiment of FIG. 1, computing system 100 includes a user system 110, a network 120, an application software system 130, an event logging system 140, a post analytics system 160, and a data storage system 180.

Figure 7:
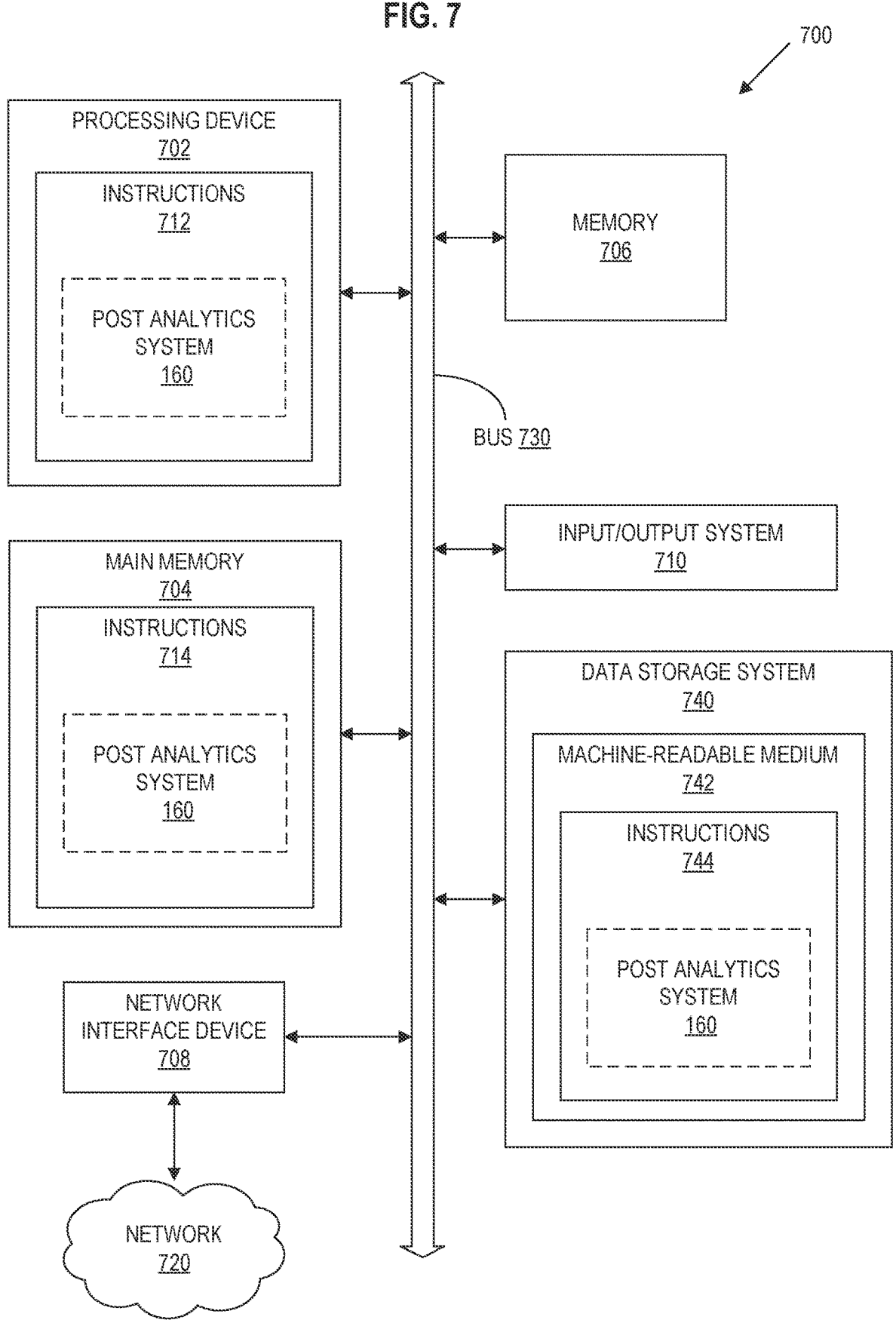
FIG. 7 is a block diagram of an example computer system in which embodiments of the present disclosure can operate.

In FIG. 1, post analytics system 160 includes a data privacy component 162. Data privacy component 162 is a software-based component that implements the technologies described herein. For example, data privacy component 162 adapts one or more differential privacy mechanisms to the characteristics of an incoming analytics data stream to produce a privatized version of the analytics data stream. As shown in FIG. 7, embodiments of data privacy component 162 are implemented as instructions stored in a memory, and a processing device 702 can be configured to execute the instructions stored in the memory to perform the operations described herein. Further details with regard to the operations of the data privacy component 162 are described below.

User system 110 includes at least one computing device, such as a personal computing device, a server, a mobile computing device, or a smart appliance. User system 110 includes at least one software application, including a user interface 112, installed on or accessible by a network to a computing device. In some embodiments, user interface 112 is or includes a front-end portion of application software system 130. For example, embodiments of user interface 112 include a graphical display screen that includes one or more slots. A slot as used herein refers to a space on a graphical display such as a web page or mobile device screen, into which digital content may be loaded, for example during a content distribution. The locations and dimensions of a particular slot on a screen are specified using, for example, a markup language such as HTML (Hypertext Markup Language). On a typical display screen, a slot is defined by two-dimensional coordinates; however, in other systems, such as a virtual reality or augmented reality implementation, a slot may be defined using a three-dimensional coordinate system.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for scrolling a news feed, creating, viewing, and interacting with social media posts, or entering a search query and viewing query results and/or other digital content. Examples of user interface 112 include mobile app user interface display screens, web browsers, command line interfaces, and non-visual user interfaces. User interface 112 as used herein can include application programming interfaces (APIs).

Posts made in an online system are a form of content distribution. Any network-based application software system can function as a content distribution system. For example, news and entertainment apps installed on mobile devices, messaging systems, and social graph-based applications can all function as content distribution systems. Content distribution systems use various criteria to determine recipients of content distributions.

Application software system 130 is any type of application software system that provides or enables at least one form of digital content distribution to user systems such as user system 110. Examples of application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

Event logging system 140 captures user interface events such as page loads, views, and clicks in real time, and formulates the user interface events into a data stream that can be consumed by, for example, a stream processing system. For example, when a user of application software system 130 selects (e.g., clicks or taps on) a user interface control such as view, comment, share, like, or loads a web page, or scrolls through a feed, etc., the event logging service fires an event to capture an identifier, an event type, a date/timestamp at which the user interface event occurred, and possibly other information about the user interface event, such as the impression portal and/or the impression channel involved in the user interface event (e.g., device type, operating system, etc.).

The event logging system 140 generates a data stream that includes one record of real-time event data for each user interface event that has occurred. Time as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes.

Post analytics system 160 generates data analytics for posts. Examples of data analytics generated by post analytics system 160 include aggregations. A running count of views on a post is an example of an aggregation. Other examples of post analytics include breakdowns. A breakdown divides a running count up by attribute value. For example, if the running count of post views is 100, and an attribute tracked by post analytics system 160 is geographic location, a breakdown created by post analytics system 160 could indicate that 50 of the 100 views were from within the United States and the other 50 views were from outside the United States. In this case, the attribute is geographic location and the possible attribute values are United States and outside the United States. Also in this case, a single view can only impact one of the two possible attribute values because a viewer can only be either in the United States or outside the United States, but not both, at a single view.

The number of possible attribute values is referred to the domain of a breakdown. The domain is referred to as known if all possible values of an attribute are known. For example, attributes that have a pre-defined taxonomy or canonical set of attribute values have a known domain. Known domains may correspond to user input fields that require the user to select a value from a pre-defined set of choices, such as a pull-down list.

A domain is referred to as unknown if all possible values of the attribute are not known. Attributes that do not have a pre-defined taxonomy of values or a canonical set of values are considered to have an unknown domain. Unknown domains may correspond to user input fields that do not restrict the user's input, such as unstructured text. Unknown domains can introduce unique security risks because the attribute values supplied by the user could reveal sensitive or private information.

For instance, a user viewing a post might have accidentally enter their phone number in the job title field or misspelled a word in a unique way. If all job titles were displayed in the breakdown, the viewing user's phone number or misspelled word would appear in the breakdown with a count of 1. These risks are accounted for by embodiments of data privacy component 162, as described in more detail below.

The number of possible attribute values whose counts can be impacted by a single user interaction is referred to as the $l_0$-sensitivity. The $l_0$-sensitivity is referred to as restricted if a single user interaction in a data stream can affect only one or less than one of the counts in the breakdown. For example, a user can only have one current location or one current seniority level at the time of a post; thus, the user's view of the post at that time only increments the sub-count for one location value or one seniority level.

The $l_0$-sensitivity is referred to as unrestricted if there is no limit to the number of attribute values that can be affected by a single user interaction in a data stream or the limit is not predetermined. For example, "unrestricted $l_0$ sensitivity" means that one user may alter every possible count of a breakdown with a single action. Unrestricted $l_0$-sensitivity can introduce unique security risks because changes to the counts of multiple attribute values by a single user interaction can result in privacy loss.

For example, if the viewing user has a unique combination of skills, say French cooking, Mandarin fluency, and Java programming, the counts for each of these skills would all increase by one based on the user's view. If all attribute values are displayed in the breakdown, the breakdown would reveal that after the user's view, the counts of these three attribute values all increased by one; thereby potentially revealing individually identifiable information about the viewing user. These challenges are addressed by embodiments of data privacy component 162, as described in more detail below.

Data storage system 180 includes data stores and/or data services that store digital content items, data received, used, manipulated, and produced by application software system 130. Alternatively or in addition, data storage system 180 includes data stores and/or data services that store data received, used, manipulated, and produced by data privacy component 162, such as post interaction data streams and/or post analytics data streams. In some embodiments, data storage system 180 includes multiple different types of data storage and/or a distributed data service. As used herein, data storage system may refer to a physical, geographic grouping of machines, a logical grouping of machines, or a single machine. For example, a data storage system may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, application software system 130, event logging system 140, post analytics system 160, and data storage system 180 includes an interface embodied as computer programming code stored in computer memory that when executed causes a computing device to enable bidirectional communication with any other of user system 110, application software system 130, event logging system 140, post analytics system 160, and data storage system 180 using a communicative coupling mechanism. Examples of communicative coupling mechanisms include network interfaces, inter-process communication (IPC) interfaces and application program interfaces (APIs).

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, event logging system 140, post analytics system 160, and data storage system 180 is implemented using at least one computing device that is communicatively coupled to electronic communications network 120. Any of user system 110, application software system 130, event logging system 140, post analytics system 160, and data storage system 180 can be bidirectionally communicatively coupled by network 120. User system 110 as well as one or more different user systems (not shown) can be bidirectionally communicatively coupled to application software system 130.

A typical user of user system 110 can be an administrator or end user of application software system 130 and/or post analytics system 160. User system 110 is configured to communicate bidirectionally with any of application software system 130, event logging system 140, and/or post analytics system 160 over network 120.

The features and functionality of user system 110, application software system 130, event logging system 140, post analytics system 160, and data storage system 180 are implemented using computer software, hardware, or software and hardware, and can include combinations of automated functionality, data structures, and digital data, which are represented schematically in the figures. User system 110, application software system 130, event logging system 140, post analytics system 160, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Figure 2:
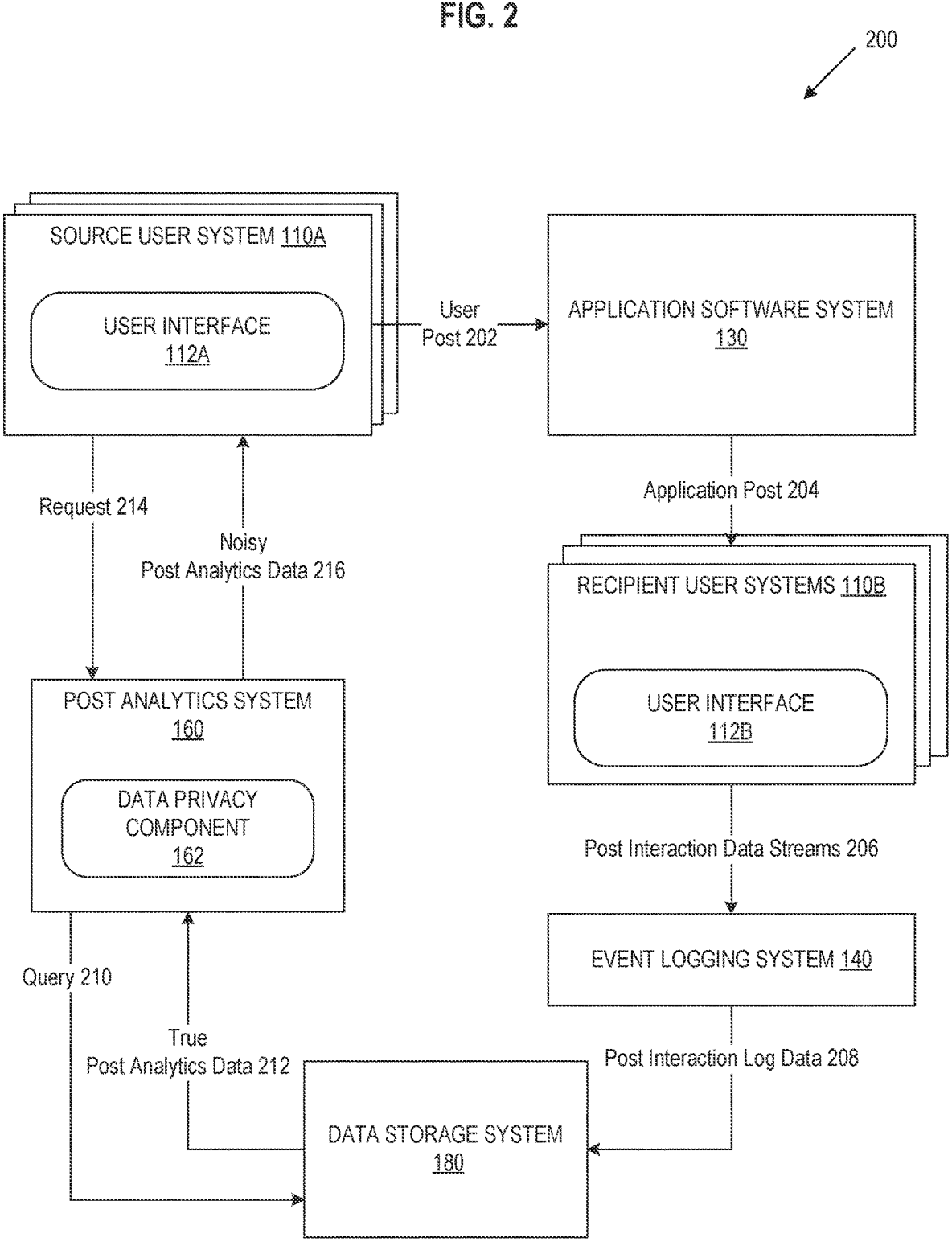
FIG. 2 is a flow diagram of an example method to apply data privacy to post analytics in accordance with some embodiments of the present disclosure.

FIG. 2 is a flow diagram of an example method 200 for applying data privacy to post analytics in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, portions of the method 200 are performed by the post analytics system 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 2, a source user creates a user post 202, for example via user interface 112A of source user system 110A. Application software system 130 receives user post 202 and transforms user post 202 into application post 204. For example, application software system re-formats user post 202 for display on various different computing platforms and/or adds one or more metatags to user post 202, which are included in application post 204. Examples of metatags that may be included in application post 204 include a post ID, a source user ID, and a timestamp of the user post 202. Application software system 130 receives many different user posts 202 from many different source user systems 110A, and any source user system 110A can submit any number of user posts 202 to application software system 130.

Application software system 130 distributes application post 204 to one or more recipient user systems 110B. When users of recipient users systems 110B interact with application post 202 via user interface 112B, the recipient user systems 110B generate user interface event signals that are included in post interaction data streams 206. For example, a view of application post 204 is included in a data stream of user interface events generated by a particular recipient user system 110B, where the data stream could include other user interface events by that particular recipient user system (such as scrolls, likes of other posts, etc.). Thus, in one example, post interaction data streams 206 include separate data streams for each recipient user system 110B.

Post interaction data streams 206 are logged by event logging system 140. For example, each user interface event generated by each recipient user system 110B is logged as a separate event. Event logging system 140 aggregates user interface event data by post ID, by recipient user system ID and/or by one or more attribute values, in some embodiments, and provides post interaction log data 208 to data storage system 180. For example, post interaction log data 208 includes user interface event data grouped by post ID. For instance, post interaction log data 208 includes a separate stream of user interface event data for each user post 202 made by each source user system 110A.

Data storage system 180 stores post interaction log data 208 in a searchable/retrievable format. For example, data storage system 180 builds indexes on post interaction log data 208 to enable retrieval of post interaction log data 208 by different types of queries for different types of analytics breakdowns.

To generate analytics breakdowns for the posting user, i.e., the user of source user system 110A, post analytics system 160 issues a query 210 to data storage system 180. In response to query 210, data storage system 180 retrieves and returns true post analytics data 212 to post analytics system 160. True post analytics data 212 includes, for example, aggregate count data. For example, true post analytics data 212 includes a running count of views of application post 202 across all recipient user systems 110B. True post analytics data 212 may also include analytics breakdowns, such as attribute value sub-counts, or post analytics system 160 may obtain or generate the breakdowns or attribute value sub-counts in response to receiving true post analytics 212 from data storage system 180. True post analytics data 212 includes raw count data; i.e., count data to which differential privacy has not yet been applied by data privacy component 162.

Data privacy component 162 applies data privacy to true post analytics data 212 or to breakdowns of true post analytics data 212 generated at post analytics system 160. Data privacy component 162 uses one or more of the adapted differential privacy mechanisms described herein. In some embodiments, data privacy component 162 reads one or more parameter values that indicate whether the breakdown domain is known or unknown and/or whether the $l_0$-sensitivity is restricted or unrestricted, and applies programming logic to the one or more parameter values to select a particular adaptation of the privacy algorithm to apply to the breakdown based on the domain and/or $l_0$-sensitivity parameter values.

Data privacy component 162 produces noisy post analytics data 216, which are privatized versions of true post analytics data 212. Data privacy component 162 or post analytics system 160 provides noisy post analytics data 216 to user interface 112A for display on, for example, an analytics user interface of the source user system 110A that created user post 202. For example, access to noisy post analytics data 216 is restricted to the user associated with the user account that created user post 202 through source user system 110A. Alternatively or in addition, access to noisy post analytics data 216 may be restricted by one or more access control rules or policies, which may be specified by the user account and/or by application software system 130, for example.

Figure 3:
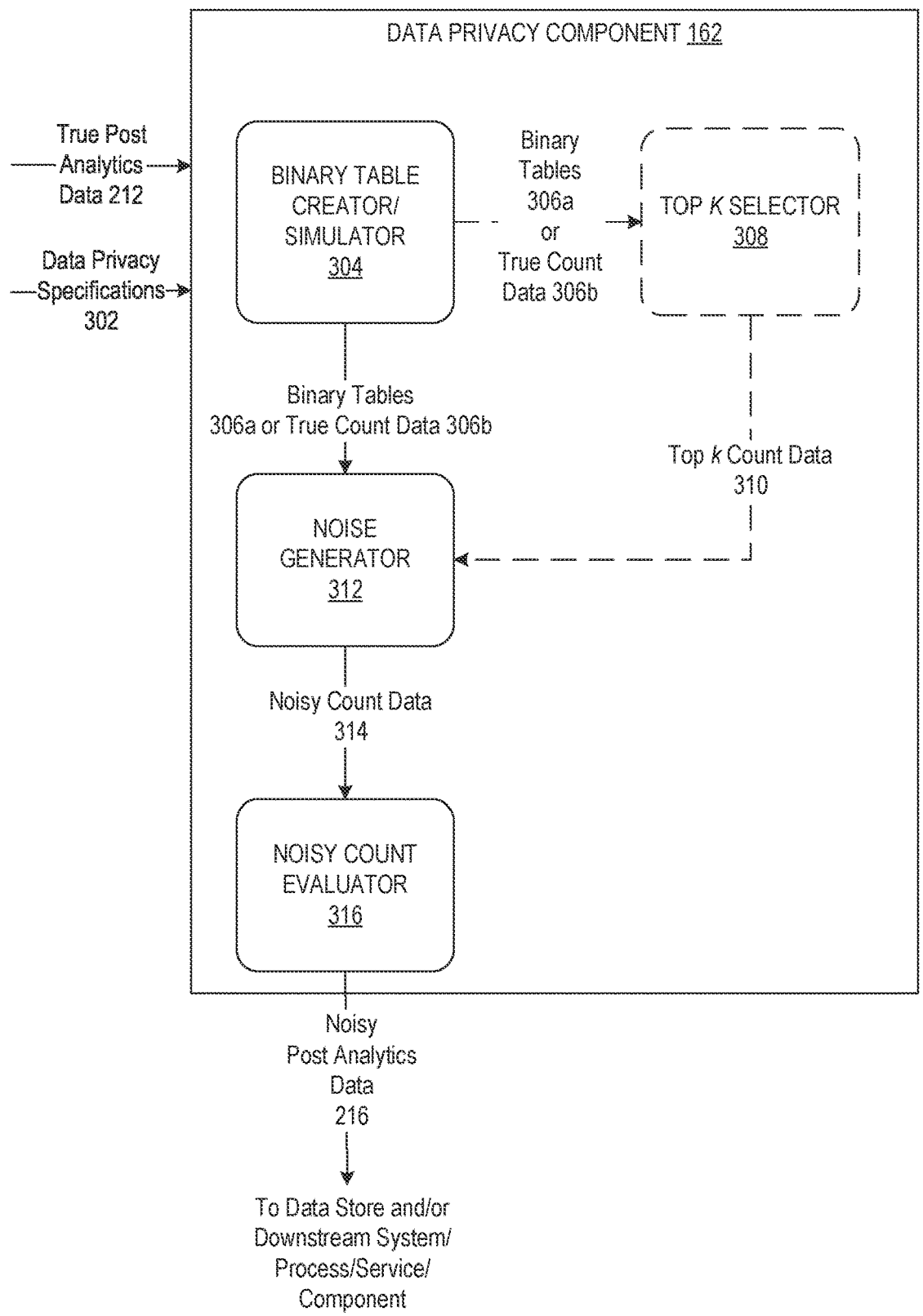
FIG. 3 is a flow diagram of an example method to implement a post analytics data privacy component in accordance with some embodiments of the present disclosure.

FIG. 3 is a flow diagram of an example method 300 to implement a post analytics data privacy component in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the data privacy component 162 of post analytics system 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3 shows an embodiment of data privacy component 162 that includes sub-components, including a binary table creator/simulator 304, a top k selector 308, a noise generator 312, and a noisy count evaluator 316. Data privacy component 162 receives inputs including true post analytics data 212 and data privacy specifications 302, and produces outputs including noisy post analytics data 216. True post analytics data 212 includes, for example, a data stream of user interface event count data, such as a running count value. Data privacy specifications 302 include, for example, domain and/or $l_0$-sensitivity indicators such as a flag that indicates whether the domain is known or unknown and another flag that indicates whether the $l_0$-sensitivity is restricted or unrestricted. Data privacy specifications 302 may include differential privacy parameter values; for example, values for privacy loss parameters such as ε and δ.

In one example implementation, binary table creator/simulator 304 creates binary tables from the data stream of true post analytics data 212 for each attribute value indicated as being associated with a post view in the data stream. The term "binary table" is used here because, as explained below, the base r of the logarithm used in the illustrated embodiments is 2. However, r could be any positive integer and the same process can be used with any value of r, such that the resulting table created or simulated by binary table creator/simulator 304 is not binary but rather r-ary. Accordingly, binary table creator/simulator 304 can also be referred to as an r-ary table creator/simulator 304.

The binary (or r-ary) tables created by binary/r-ary table creator/simulator 304 are used to generate a running count of post views associated with a particular attribute value at the time of a particular event t.

Referring to the example in which r=2, to create a binary table, in some embodiments, binary table creator/simulator 304 creates a binary tree in which each t-th event indicator from the true post analytics data 212 is inserted into the t-th leaf of the binary tree such that the sum at each node of the tree is equal to the sum of the node's children. Examples of event indicators include 0=the post was not viewed by the attribute value or 1=the post was viewed by the attribute value. Thus, each node of the binary tree for a particular attribute value contains a partial sum of the count data. Binary table creator/simulator 304 maps the tree of partial sums into a partial sum table to create a binary table 306a. An example of a binary table is shown in FIG. 4A, described below. Binary table creator/simulator 304 provides binary tables 306a for use by downstream components such as top k selector 308 and/or noise generator 312, described below.

For post analytics breakdowns, in some embodiments, binary table creator/simulator 304 creates or simulates a separate binary table 306a for each possible attribute value that could be included in the breakdown. For example, if the breakdown is on the job title attribute, and the set of possible values of job title includes Software Developer and Software Development Manager, binary table creator/simulator 304 creates or simulates two binary tables: one binary table to keep track of the running count of post views by users with the job title of Software Developer and another binary table to keep track of the running count of post views by users with the job title of Software Development Manager.

Top k selector 308 uses the attribute value-specific binary tables 306a produced by binary table creator/simulator 304 to generate top k count data 310. Top k selector 308 is used when certain data privacy conditions are present, such as when data privacy specifications 302 indicate that the $l_0$-sensitivity is unrestricted and the domain is either known or unknown. Top k selector 308 need not be used when certain other data privacy conditions are present, such as when data privacy specifications 302 indicate that the $l_0$-sensitivity is restricted.

When the $l_0$-sensitivity is unrestricted, a single user interface event can impact more than one attribute value sub-count. To increase data privacy by limiting or reducing the number of impacted attribute value sub-counts that are included in the analytics breakdown, top k selector 308 selects up to k sub-counts having the highest running counts, where k is a positive integer less than the total number of possible attribute values. For example, if the attribute is "skill," and there are 100 different possible skill values (e.g., JavaScript, R, Python, etc.), and a single user can have all of those skills such that a view of a post increments the sub-count for each of those attribute values, top k selector 308 filters out the attribute value sub-counts that are not in the top k (for example, if k is set to 5, top k selector 308 only shows the sub-counts for the skills that have the top 5 highest sub-counts).

As another example, if, after 150 total views of a post, the counts over 100 possible skill values include the following sub-counts: skill=Java has sub-count of 100, skill=R has sub-count of 50, skill=baking has sub-count of 25, skill=python has sub-count=10 and all other skill sub-counts are zero, and k=2, then top k selector 308 would only select skill=Java and skill=R.

Noise generator 312 adds noise to true count data in accordance with one or more differential privacy mechanisms. Differential privacy is a system for publicly sharing information about a dataset by describing the patterns of groups within the dataset while withholding information about individuals in the dataset. Differential privacy is based on the principle that if the effect of making an arbitrary single substitution in the database is small enough, the query result cannot be used to infer much about any single individual, and therefore provides privacy. Another way to describe differential privacy is as a constraint on the algorithms used to publish aggregate information about a statistical database which limits the disclosure of private information of records whose information is in the database. For example, differentially private algorithms can be used to publish demographic information or other statistical aggregates while ensuring confidentiality of data about individuals. In general terms, an algorithm is differentially private if an observer seeing the output of the algorithm cannot tell if a particular individual's information was used in the computation.

In one example implementation, noise generator 312 adds noise to true count data provided by or extracted from a binary table 306a and/or top k count data 310 to produce noisy count data 314. The amount of noise added to the true count data by noise generator 312 is determined based on the values of the differential privacy parameters ε and δ. Small delta δ represents an approximation parameter in approximate differential privacy. The epsilon value can be adjusted to increase or decrease the amount of noise, and hence, the level of data privacy. For example, larger epsilon values can signify a lower degree of data privacy. The values of the differential privacy parameters ε and δ are determined in accordance with the requirements of a particular design or implementation of data privacy component 162.

To generate the noise, noise generator 312 uses, for example, a Gaussian mechanism and/or a Laplace mechanism. Noise generator 312 does not add noise to every single sub-count. For example, noise generator 312 does not add noise to every cell of a binary table 306a. Rather, noise generator 312 adds noise to the true current counts of each attribute value or element by selecting the corresponding entries in the binary table for the current total number of views. For example, after 150 views, where 150 is written in binary as 10010110, noise generator 312 selects noise terms in each binary table that correspond to the 1's in the binary expansion and adds the selected noise terms to the true counts of each element, e.g. for job title with two possible vales, software engineer with count=80 and manager with count=70, noise generator 312 adds the selected noise terms for the binary expansion of 150 to each of these values, where the noise for job title=software engineer will be different from the noise for job title=manager.

In some implementations, binary table creator/simulator 304 does not actually create binary tables 306a but rather generates a simulation of the binary tables and uses the simulated binary tables to generate true count data 306b. In these implementations, binary table creator/simulator 304 is configured as a simulator that outputs true count data 306b rather than binary tables 306a. For example, binary table creator/simulator 304 uses the current total number of rounds to generate a simulated binary table and determine which cells in the simulated binary table correspond to the true count data and therefore would be used to generate noise terms if the binary table were actually created.

In the simulated binary table implementations, noise generator 312 uses the true count data 306b to determine which cells in the simulated binary table would be used to generate noise terms if the binary table were actually created. To simulate the binary table, binary table creator/simulator 304 generates a binary representation of the true count data 306b rather than actually creating a table. Binary table creator/simulator 304 uses the binary representation of the true count data 306b to identify the "cells" that would be used to generate noise, i.e., the positions of the binary representation that have a value of 1 instead of 0. A more specific illustration of a binary table simulation is described further below.

Once noise generator 312 identifies the cells that would be used to generate noise have been identified, noise generator 312 uses the indices corresponding to the identified cells and a pseudorandom seed to determine the cell-specific noise terms and sums all of the cell-specific noise terms together. Noise generator 312 adds the sum of the cell-specific noise terms to the true count (e.g. number of data scientists that viewed my post after 100 views).

Noise generator 312 uses the pseudorandom seed to ensure that if a particular cell-specific noise term in the simulated binary table is used again for a later count, the same seed can still be used to generate the same noise for the later count. In the simulated binary table implementation, the binary tables do not need to be generated and stored, but noise can still be generated as if the binary tables had been created. In cases where there are many different possible attribute values each needing its own binary table, considerable savings of computational resources and storage can be realized using the binary table simulation.

Noisy count evaluator 316 computes threshold values using the differential privacy parameters ε and δ and compares the noisy count data 314 to the computed threshold values. In computing the threshold values, noisy count evaluator 316 may add noise to the threshold value in which case noise is added on both sides of the comparison operation and the term threshold refers to a noisy threshold. The function used by noisy count evaluator 316 to compute the threshold values is configurable, for example based on one or more of data privacy specifications 302. For instance, noisy count evaluator 316 could compute the threshold values differently depending on whether the analytics breakdown domain is known or unknown and/or whether the $l_0$-sensitivity is restricted or unrestricted. An example of a function used to compute a threshold in some embodiments is described below with reference to FIG. 4B.

The threshold computed by noisy count evaluator 316 is used by noisy count evaluator 316 to determine whether a particular portion of noisy count data 314 is to be included in noisy post analytics data 216, which is the (noisy) breakdown presented to the posting user. For example, if the noisy count data 314 is less than or equal to a corresponding threshold, the noisy count data 314 is not included in the data stream of noisy post analytics data 216 (i.e., noisy count breakdown) that is streamed to the posting user's device to be presented to the posting user, or is not stored and/or provided to any downstream system, process, service, or component. As another example, if the noisy count data 314 is greater than a corresponding threshold, the noisy count data 314 is included in the noisy post analytics data 216 (i.e., noisy count breakdown) that is presented to the posting user, stored, and/or provided to a downstream system, process, service, or component.

As used herein, a noisy count breakdown includes one or more noisy counts. For example, a breakdown on job title has a noisy count for software engineer and a noisy count for program manager. If the noisy count for software engineer or the noisy count for program manager isn't higher than the threshold, it won't be included in the noisy count breakdown.

FIG. 4A is an example of an r-ary (here, binary) table 400, where r is the logarithm base used in a particular implementation, in accordance with some embodiments of the present disclosure. For example, r-ary table 400 could be created by binary table creator/simulator 304. In FIG. 4A, the round number corresponds to the total number of detected user interface events and the running count indicates the then-current running count at each round(such that, where the count increments by at most one at each round, the round number corresponds to the number of events that have occurred.

R-ary table 400 is specific to a particular attribute value. For example, r-ary table 400 keeps track of all of the post views by users having the attribute value of Job Title=Data Scientist, and other r-ary tables would be created to keep track of the post views by other attribute values (e.g., Job Title=Software Engineer, Company=LinkedIn). Thus, in the example of FIG. 4A, at round 1, no data scientists had viewed the post but by round 4, 2 data scientists had viewed the post and by round 8, 4 data scientists had viewed the post. A similar r-ary table is created for other attribute values associated with the user interface events on the post. Thus, a running count is maintained over the time interval for each attribute value for which post views are being tracked.

Each row of r-ary table 400 contains at least one cell. The number of cells in the first row of r-ary table 400 corresponds to the current total number of rounds completed so far, over the time interval, i.e., there are T cells in the top row, where T is the then-current length of the data stream. In the example of FIG. 4A, T=8, but T could be any positive integer and may specify a maximum length of the data stream in some embodiments. For example, if 8 rounds have been completed, there are 8 cells in the top row of r-ary table 400. Each cell of the top row of r-ary table 400 indicates whether or not a post view associated with the specified attribute value (e.g., data scientist) was detected. Using the above example, if the value of a cell of the top row is 0, a post view by a data scientist was not detected (e.g., a post view might have been detected but the view was not by a data scientist). Also in the above example, if the value of a cell of the top row is 1, a post view by a data scientist was detected.

Each subsequent row of r-ary table 400 contains fewer cells than the previous row. Each cell of each subsequent row contains a partial sum. For example, cell C includes the partial sum (a pairwise combination) of the counts from rounds 5 and 6. Cell D includes the partial sum of all of the counts up to round 4, or the running count as of the completion of round 4. The last row of the r-ary table contains one cell, whose value corresponds to the total running count as of the last completed round.

Using the r-ary table, a running count can be determined at any round by summing only the highest level of granularity of partial sums across the depth of the r-ary table. For example, the running count at round 7 can be computed by summing the values of cells B, C, and D rather than having to sum all of the values of the top-row cells for rounds 1-7. Similarly, the running count at round 4 can be determined simply by extracting the value of cell D from the r-ary table. To introduce privacy, it suffices to add noise to each cell of the r-ary table. Thus, use of the r-ary table can reduce the number of noise terms needed to determine the privatized running count at any round, requiring at most the height of the table number of noise terms (logarithmic in the length of the stream T). As a result, the amount of noise introduced into the counts to provide data privacy is reduced because all terms in a single row of the table need not be added to obtain the noisy running count, which would result in adding at most T noise terms.

For example, to add noise to the running count at round 7, noise needs to be added to each of cells B, C, and D. Similarly, to add noise to the running count at round 6, noise needs to be added to both cells C and D and not to all of cells B, C, and D, and not to all six of the cells in the top row of the r-ary table up to round 6. In this way, the number of cells in any row of the r-ary table that can be impacted by a change to the count at any round is $\log_2(T)+1$. For instance, in the example of FIG. 4A, T=8 so $\log_2(T)+1=4$ such that the impact of a change to the running count can impact at most one cell of each row of the r-ary table. Thus, using the approaches described herein, total privacy loss due to the addition of noise scales at log(T) rather than T. Slower scaling of privacy loss is beneficial because data privacy requirements can continue to be met as T continues to increase, which also increases the number of queries that can be asked on the stream for the same level of privacy.

The method for adding noise to an actual or simulated r-ary table may be referred to herein as a "base mechanism" or "BaseMech." In formal terms, an embodiment of BaseMech can be represented as follows:

Parameters:
    r: log base (integer bigger or equal to 2)
    τ: standard deviation of noise used (positive real value)
    T: maximum length of the stream (positive integer)

Input: a stream $\sigma_1, \sigma_2, \ldots, \sigma_T$ of bits $\sigma_t \in \{0,1\}$ for $t \in [T]$.
BaseMech Algorithm: an adapted binary mechanism; for example, the binary mechanism described in Chan, et al. 2011 modified as follows:
    Use Gaussian noise with standard deviation τ>0 instead of Laplace noise
    Use log base r instead of base 2, where base 2 would use a Binary Table and otherwise would be a r-ary Table.

FIG. 4B, FIG. 4C, and FIG. 4D are examples of data privacy mechanisms that have been adapted for continual observation settings in accordance with some embodiments of the present disclosure. The BaseMech algorithm described above is used as a component to one or more of these other mechanisms, in some embodiments, and is referred to as BaseMech in FIG. 4C and FIG. 4D.

The data privacy algorithms shown in FIG. 4B, FIG. 4C, and FIG. 4D are applicable to different continual observation settings as shown in Table 1 below.

TABLE 1

Differential Privacy Mechanisms for Data Analytics Tasks in the Continual Observation Setting.

| Continual Observation | Restricted $l_0$-sensitivity | Unrestricted $l_0$-sensitivity |
|---|---|---|
| Known Domain | — | FIG. 4C |
| Unknown Domain | FIG. 4B | FIG. 4D |

Table 1 can be converted into computer programming logic, for example in the form of Boolean logic or rules. As such, data privacy component 162 of post analytics system 160 can be configured to invoke any of the algorithms of FIG. 4B, FIG. 4C, and/or FIG. 4D selectively based on one or more of the characteristics of an incoming post analytics data set. For example, referring to FIG. 3, upon reading data privacy specifications 302 for a particular stream of true post analytics data 212, data privacy component 162 can determine whether to invoke the algorithm of FIG. 4B, the mechanism of FIG. 4C, the mechanism of FIG. 4D, a variation of any of the mechanisms of FIG. 4B, FIG. 4C, and FIG. 4D, or another differential privacy mechanism.

FIG. 4B illustrates an example of a differential privacy mechanism UnkBase, which is adapted for streaming analytics having an unknown domain and restricted $l_0$-sensitivity, i.e., a continual observation setting in which a post view can contribute to a known number $\Delta_0$ of attribute value sub-counts at any round and the domain of attribute values is unknown. The UnkBase algorithm of FIG. 4B applies a threshold to the noisy count to ensure that the probability that an attribute value with a sub-count of one is very small. The UnkBase algorithm of FIG. 4B is not limited to use with unknown domains but also can be applied to known domain scenarios with restricted $l_0$-sensitivity, especially if the known domain is large.

The UnkBase algorithm takes the items of count data, denoted as U, which have appeared in a data stream up to time t, forms a current histogram $h(\omega_1, \ldots, \omega_t)=h_t$, where $\omega_t$ denotes a subset of items of count data in the data stream and $h_t$ is the histogram of counts in the stream up to round t. The UnkBase algorithm adds noise each element to $h_t$, and only shows the noisy items in the post analytics if the noisy count is above a threshold, where the threshold is computed using the function $m_S := \tau L_r \sqrt{r-1} \Phi^{-1} (1-\delta/T)+1$, where τ denotes the standard deviation of noise in each cell, L denotes a ceiling function, e.g., $L_r = \text{ceil}(\log_r(T))+1$, where r denotes the base used for the logarithmic function (e.g., r=2 for binary table), and Φ denotes a cumulative probability distribution function for a standard normal random variable. The UnkBase algorithm adds noise to $h_t$ as described above. For example, the UnkBase algorithm adds noise according to the KnownBase algorithm described in T. H. Chan, E. Shi, and D. Song, "Private and continual release of statistics," *ACM Trans. Inf. Syst. Secur.*, 14(3):26:1{26:24, 2011, doi: 10.1145/2043621.2043626. The UnkBase algorithm is applied to each new set of items $D_t$ at each round $t \in [T]$.

FIG. 4C illustrates an example of a differential privacy mechanism sparseGumb, which is adapted for streaming analytics having a known domain and unrestricted $l_0$-sensitivity, i.e., a continual observation setting in which a post view can contribute to an unknown number of attribute value sub-counts at any round and the domain of attribute values is known. The sparseGumb algorithm of FIG. 4C only returns, for display to the posting user or downstream use, the top k noisy counts at each round t, which are computed based on all of the events that have occurred in the data stream up to that round. In FIG. 4C, references to BaseMech refer to the BaseMech algorithm described in Chan et al., citation above, and references to KnownGumb refer to the KnownGumb algorithm described in Rogers, Ryan, Subbu Subramaniam, Sean Peng, David Durfee, Seunghyun Lee, Santosh Kumar Kancha, Shraddha Sahay, and Parvez Ahammad, 2021, "LinkedIn's Audience Engagements API: A Privacy Preserving Data Analytics System at Scale," *Journal of Privacy and Confidentiality* 11(3), https://doi.org/10.29012/jpc.782, incorporated herein by this reference. The KnownGumb mechanism adapts a privacy algorithm from F. McSherry and K. Talwar, "Mechanism design via differential privacy," 48*th Annual Symposium on Foundations of Computer Science*, 2007 for an efficient implementation.

At each round, a check is performed to see if the selected top-k attribute values (or elements) should still be considered as the top elements, due to some counts increasing. In some embodiments, the sparse vector technique from C. Dwork, M. Naor, O. Reingold, G. N. Rothblum, S. Vadhan, "On the complexity of differentially private data release," *Proceedings of the 41$^{st}$ annual ACM Symposium on Theory of Computing*, STOC'09, is used to check whether the element with the highest count, outside of the currently selected at most k elements, has a noisy count that is higher than the smallest noisy count from the selected elements by at least a threshold amount, where the threshold amount is determined based on the data security requirements of the particular design. If the highest-count element outside of the currently selected at most k elements has a noisy count that exceeds the smallest noisy count by at least the applicable threshold amount, then KnownGumbel is rerun to select a possible different set of top-k elements. Throughout the entire process, a new top-k set of elements can only be selected at most s times, where s is a parameter set in advanced based on the data security requirements of a particular design (e.g., desired privacy level). To prevent too many changes in the set of top k elements (also referred to as switches) from occurring, for example due to noisy counts possibly causing equal values to change the top k, another parameter $\eta>0$ is used. The parameter $\eta$ may change at each round t, so that $\eta=\eta_t>0$ and noisy counts must be at least $\eta$ apart before a switch should occur, i.e., before a new set of top k elements should be selected.

In some embodiments, k=1 such that the sparseGumb algorithm only returns the attribute value sub-count that has the maximum noisy value. In this example, the output is not a breakdown over all possible attribute values but rather an indication of the most common attribute value associated with the post views in the time interval (for example, of all of the skills associated with the users who viewed a post after 1000 views, the most common skill was Python).

FIG. 4D illustrates an example of a differential privacy mechanism sparseUnkGumb, which is adapted for streaming analytics having an unknown domain and unrestricted $l_0$-sensitivity, i.e., a continual observation setting in which a post view can contribute to an unknown number of attribute value sub-counts at any round and the domain of attribute values is unknown. The sparseUnkGumb algorithm of FIG. 4D is similar to the sparseGumb algorithm of FIG. 4C, an initial set of top k items (i.e., attribute value sub-counts) is selected where k'>k and both k and k' are parameters. Given k and k,' the algorithm described in Ryan Rogers, et al., U.S. Pat. No. 11,170,131, referred to herein as UnkGumb, is used to select the top at most k items at a given initial round after some round $t_0>1$. The BaseMech algorithm described above is used to generate the sub-counts for the selected set of at most k items, which can be used to provide a stream of counts at that round. Because the items in the top k can vary from round to round, the UnkGumb algorithm then fetches the true top k+1 items and compares the smallest noisy count from the selected top at most k with the noisy count with the true maximum value. If there is no change to the set of true top k items, such that no items in the set need to be replace with new items, no additional noise is added. If for example the true top item has a sufficiently larger count value that at least one item already in the selected set, the UnkGumb algorithm is then used to select a new set of top at most k items from the set of true top $\bar{k}$ elements where $\bar{k}>k$.

FIG. 5 is a flow diagram of an example method 500 for applying data privacy to post analytics in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the post analytics system 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device receives a data stream that includes instances of count data, where an instance of the count data indicates whether a user interface interaction with a post associated with an account in an online system has occurred. Operation 502 is performed by, for example, post analytics system 160.

At operation 504, the processing device, using the count data received at operation 502, computes a true count breakdown that includes, for the post, a set of sub-counts of non-public user interface interactions on the post, where a sub-count of the set of sub-counts is an aggregate count associated with a particular value of an attribute that has a plurality of different possible values.

In some embodiments, a portion of operation 504 includes creating a simulation of a binary table (or an r-ary table, as described above) for the sub-count, and using the simulation of the binary table to determine an amount of noise to add to the sub-count. Operation 504 is performed by, for example, data privacy component 162. For instance, operation 504 is performed by binary table creator/simulator 304.

At operation 506, the processing device applies at least one differential privacy mechanism to the set of sub-counts to produce a noisy count breakdown. In some embodiments, operation 506 includes determining a noisy sub-count by adding noise to the sub-count, and, when the noisy sub-count is greater than a threshold, including the noisy sub-count in the noisy count breakdown. In some embodiments, operation 506 includes determining a value of at least one data privacy parameter, selecting a differential privacy mechanism based on the value, and computing the threshold using the value and the selected differential privacy mechanism. In some embodiments, operation 506 is performed when the number of different possible values of the attribute is variable and the user interface interaction associated with the instance changes at most one sub-count of the set of sub-counts. Operation 506 is performed by, for example, data privacy component 162. For instance, portions of operation 506 are performed by noise generator 312 and/or noisy count evaluator 316.

In other embodiments, operation 506 includes selecting, from the set of sub-counts, a set of top k true sub-counts, where k is a positive integer less than a total number of possible values of the attribute, determining a set of noisy top k sub-counts by adding noise to each sub-count of the set of top k sub-counts, selecting, from the set of noisy top k sub-counts, at least one noisy sub-count that is greater than a threshold, and including the selected at least one noisy sub-count in the noisy count breakdown. In those other embodiments, operation 506 may be performed when the number of the plurality of different possible values is fixed and the instance changes more than one sub-count of the set of sub-counts.

In still other embodiments, operation 506 includes creating a simulation of a binary table for each value of the plurality of different possible values of the attribute, and, using the simulations of the binary tables, determining amounts of noise. In these other embodiments, operation 506 further includes selecting, from the set of sub-counts, a set of top k+1 sub-counts, where k is a positive integer less than a total number of possible values of the attribute, and determining a set of noisy top k+1 sub-counts by adding the amounts of noise to each sub-count of the set of top k+1 sub-counts. When a noisy sub-count of the set of noisy top k+1 sub-counts is greater than a threshold, operation 506 includes the noisy sub-count in a set of at most k noisy sub-counts and includes the set of at most k noisy sub-counts in the noisy count breakdown. These other embodiments of operation 506 may be performed when the number of the plurality of different possible values is variable and the instance changes more than one sub-count of the set of sub-counts.

The various embodiments of operation 506 are performed by, for example, data privacy component 162. For instance, portions of operation 506 are performed by top k selector 308, noise generator 312 and/or noisy count evaluator 316, in various embodiments.

At operation 508, the processing device streams the noisy count breakdown (which includes one or more noisy counts) instead of the true count breakdown (which does not include any noise) to a computing device associated with the account. For example, the noisy count breakdown is displayed on a user interface of the computing device associated with the account in response to a page load request from the computing device. In another example, a new version of the noisy count breakdown is created, for example after a subsequent event is detected, and, in response to a page refresh request from the computing device, the new version of the noisy count breakdown is displayed on the user interface of the computing device. Operation 508 is performed by, for example, data privacy component 162. For instance, portions of operation 508 are performed by noisy count evaluator 316.

Figure 6:
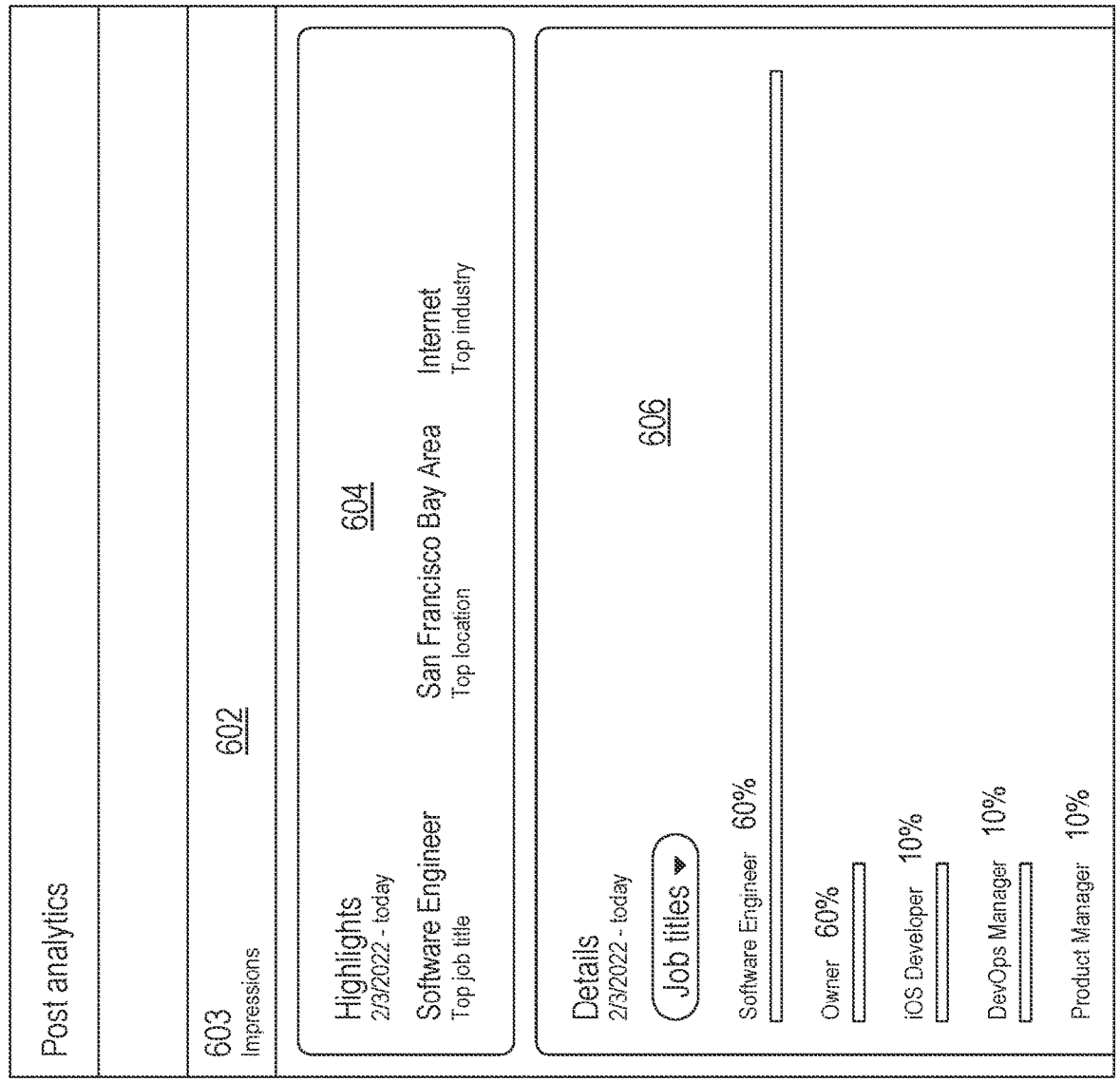
FIG. 6 is an example post analytics display screen in accordance with some embodiments of the present disclosure.

FIG. 6 is an example post analytics display screen in accordance with some embodiments of the present disclosure. The example display screen 600 includes noisy post analytics data 216 that may be displayed to a posting user for a particular post created by the posting user in an online system. Section 602 of display screen 600 displays a total number of views (or impressions) as of a most recent time prior to the generation of the analytics display. If the posting user were to refresh their screen immediately after viewing the display 600, the value at section 602 and all other values on screen 600 could change, because the running counts and breakdowns are updated in real time.

Section 604 of screen 600 illustrates an analytics breakdown created using an application of the algorithm shown in FIG. 4B, described above, which return only the attribute value that has the maximum count. For instance, of all of the 603 views of the post, the job title of Software Engineer had the most views of all job titles, the location of San Francisco Bay Area had the most views of all locations, and the industry of Internet had the most views of all industries.

Section 606 of screen 600 illustrates a more detailed analytics breakdown for a particular attribute (here, job title), created using an application of the algorithm shown in FIG. 4C, described above, which returns only the top k job titles (where k=5 in the example). FIG. 4C also shows an example of noisy count values converted to percentages to avoid confusion that might result from the introduction of noise into the counts. Alternatively or in addition, the noisy count values can be represented graphically, for example as a bar chart or pie chart.

Section 606 is user-configurable such that the attribute for which the detailed breakdown is shown can be changed by selection of a user interface control. For example, clicking on the down arrow next to "Job titles" enables the posting user to view a more detailed analytics breakdown for another attribute, such as location or industry.

FIG. 7 is a block diagram of an example computer system 700 in which embodiments of the present disclosure can operate. FIG. 7 illustrates an example machine of a computer system 700 within which a set of instructions, for causing the machine to perform any one or more of the methodologies discussed herein, can be executed. In some embodiments, the computer system 700 can correspond to a component of a networked computer system (e.g., the computer system 100 of FIG. 1) that includes, is coupled to, or utilizes a machine to execute an operating system to perform operations corresponding to post analytics system 160 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a memory 706 (e.g., flash memory, static random access memory (SRAM), etc.), an input/output system 710, and a data storage system 740, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 712 for performing the operations and steps discussed herein.

Instructions 712 include portions of the post analytics system when the processing device 702 is executing those portions of the post analytics system 702. Thus, similar to the description above, post analytics system 160 is shown in dashed lines as part of instructions 712 to illustrate that, at times, portions of post analytics system 160 are executed by processing device 702. For example, when at least some portion of the post analytics system is embodied in instructions to cause processing device 702 to perform the method(s) described above, some of those instructions can be read into processing device 702 (e.g., into an internal cache or other memory) from main memory 704 and/or data storage system 740. However, it is not required that all of post analytics system 160 be included in instructions 712 at the same time and portions of post analytics system 160 are stored in one or more other components of computer system 700 at other times, e.g., when one or more portions of post analytics system 160 are not being executed by processing device 702.

The computer system 700 further includes a network interface device 708 to communicate over the network 720. Network interface device 708 provides a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 includes an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702. Sensed information can include voice commands, audio signals, geographic location information, and/or digital imagery, for example.

The data storage system 740 includes a machine-readable storage medium 742 (also known as a computer-readable medium) on which is stored one or more sets of instructions 744 or software embodying any one or more of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 726 include instructions to implement functionality corresponding to a data privacy component (e.g., the data privacy component 162 of FIG. 1).

Dashed lines are used in FIG. 7 to indicate that it is not required that the post analytics system be embodied entirely in instructions 712, 714, and 744 at the same time. In one example, portions of the post analytics system are embodied in instructions 744, which are read into main memory 704 as instructions 714, and portions of instructions 714 are read into processing device 702 as instructions 712 for execution. In another example, some portions of the post analytics system are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods of FIG. 2, FIG. 3, FIG. 4B, FIG. 4C, FIG. 4D, and/or FIG. 5 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes: receiving a data stream including instances of count data collected over a time interval; an instance of the count data represents an occurrence of a user interface interaction with a post; the post is associated with an account in an online system; using the count data, computing a true count breakdown including a set of sub-counts of non-public user interface interactions on the post; where at least one of the sub-counts is a count associated with a particular value of an attribute that has a plurality of different possible values and the attribute is associated with the non-public user interface interactions on the post; creating a noisy count breakdown by applying at least one differential privacy mechanism to the set of sub-counts; and streaming the noisy count breakdown instead of the true count breakdown to a computing device associated with the account.

An example 2 includes the subject matter of example 1, further including: in response to a page load request from the computing device, displaying the noisy count breakdown on a user interface of the computing device. An example 3 includes the subject matter of example 2, further including: creating a new version of the noisy count breakdown and, in response to a page refresh request from the computing device, displaying the new version of the noisy count breakdown on the user interface of the computing device. An example 4 includes the subject matter of any of examples 1-3, further including: creating a simulation of a binary table for the sub-count; and using the simulation of the binary table, determining an amount of noise to add to the sub-count. An example 5 includes the subject matter of example 4, where applying the at least one differential privacy mechanism to the set of sub-counts further includes: determining a noisy sub-count by adding the amount of noise to the sub-count; and when the noisy sub-count is greater than a threshold, including the noisy sub-count in the noisy count breakdown. An example 6 includes the subject matter of example 5, further including: determining a value of at least one data privacy parameter; selecting a differential privacy mechanism based on the value; and computing the threshold using the value and the selected differential privacy mechanism. An example 7 includes the subject matter of example 6, further including: determining that the number of different possible values of the attribute is variable; and determining that the user interface interaction associated with the instance changes at most one sub-count of the set of sub-counts. An example 8 includes the subject matter of any of examples 1-7, where applying the at least one differential privacy mechanism to the set of sub-counts further includes: creating a simulation of a binary table for each value of the plurality of different possible values of the attribute; using the simulations of the binary tables, determining amounts of noise to be added to the set of sub-counts; selecting, from the set of sub-counts, a set of top k true sub-counts; k is a positive integer less than a total number of possible values of the attribute; determining a set of noisy top k sub-counts by adding the amounts of noise to each true sub-count of the set of top k true sub-counts; selecting, from the set of noisy top k sub-counts, at least one noisy sub-count that is greater than a threshold; and including the selected at least one noisy sub-count in the noisy count breakdown. An example 9 includes the subject matter of example 8, further including: determining that the total number of possible values of the attribute is fixed; and determining that the instance changes more than one sub-count of the set of sub-counts. An example 10 includes the subject matter of example 1, where applying the at least one differential privacy mechanism to the set of sub-counts further includes: creating a simulation of a binary table for each value of the plurality of different possible values of the attribute; using the simulations of the binary tables, determining amounts of noise to be added to the set of sub-counts; selecting, from the set of sub-counts, a set of top k+1 true sub-counts; k is a positive integer less than a total number of possible values of the attribute;

determining a set of noisy top k+1 sub-counts by adding the amounts of noise to the set of top k+1 true sub-counts; and when a noisy sub-count of the set of noisy top k+1 sub-counts is greater than a threshold, including the noisy sub-count in a set of at most k noisy sub-counts; and including the set of at most k noisy sub-counts in the noisy count breakdown. An example 11 includes the subject matter of example 10, further including: determining that the total number of possible values of the attribute is variable; and determining that the instance changes more than one sub-count of the set of sub-counts.

In an example 12, a system includes: at least one memory including instructions; and at least one processor coupled to the at least one memory; where the at least one processor, when executing the instructions, is capable of performing operations including: receiving a data stream including instances of count data collected over a time interval; an instance of the count data represents an occurrence of a user interface interaction with a post; the post is associated with an account in an online system; using the count data, computing a true count breakdown including a set of sub-counts of non-public user interface interactions on the post; where at least one of the sub-counts is a count associated with a particular value of an attribute that has a plurality of different possible values and the attribute is associated with the non-public user interface interactions on the post; creating a noisy count breakdown by applying at least one differential privacy mechanism to the set of sub-counts; and streaming the noisy count breakdown instead of the true count breakdown to a computing device associated with the account.

An example 13 includes the subject matter of example 12, where the at least one processor, when executing the instructions, is capable of performing operations further including: in response to a page load request from the computing device, displaying the noisy count breakdown on a user interface of the computing device. An example 14 includes the subject matter of example 12, where the at least one processor, when executing the instructions, is capable of performing operations further including: creating a new version of the noisy count breakdown and, in response to a page refresh request from the computing device, displaying the new version of the noisy count breakdown on the user interface of the computing device. An example 15 includes the subject matter of example 12, where the at least one processor, when executing the instructions, is capable of performing operations further including: creating a simulation of a binary table for the sub-count; using the simulation of the binary table, determining an amount of noise to add to the sub-count; determining a noisy sub-count by adding the amount of noise to the sub-count; and when the noisy sub-count is greater than a threshold, including the noisy sub-count in the noisy count breakdown. An example 16 includes the subject matter of example 15, where the at least one processor, when executing the instructions, is capable of performing operations further including: determining a value of at least one data privacy parameter; selecting a differential privacy mechanism based on the value; computing the threshold using the value and the selected differential privacy mechanism; determining that the number of different possible values of the attribute is variable; and determining that the user interface interaction associated with the instance changes at most one sub-count of the set of sub-counts. An example 17 includes the subject matter of example 12, where the at least one processor, when executing the instructions, is capable of performing operations further including: creating a simulation of a binary table for each value of the plurality of different possible values of the attribute; using the simulations of the binary tables, determining amounts of noise to be added to the set of sub-counts; selecting, from the set of sub-counts, a set of top k true sub-counts; k is a positive integer less than a total number of possible values of the attribute; determining a set of noisy top k sub-counts by adding the amounts of noise to each true sub-count of the set of top k true sub-counts; selecting, from the set of noisy top k sub-counts, at least one noisy sub-count that is greater than a threshold; and including the selected at least one noisy sub-count in the noisy count breakdown. An example 18 includes the subject matter of example 17, where the at least one processor, when executing the instructions, is capable of performing operations further including: determining that the total number of possible values of the attribute is fixed; and determining that the instance changes more than one sub-count of the set of sub-counts. An example 19 includes the subject matter of example 12, where the at least one processor, when executing the instructions, is capable of performing operations further including: creating a simulation of a binary table for each value of the plurality of different possible values of the attribute; using the simulations of the binary tables, determining amounts of noise to be added to the set of sub-counts; selecting, from the set of sub-counts, a set of top k+1 true sub-counts; k is a positive integer less than a total number of possible values of the attribute; determining a set of noisy top k+1 sub-counts by adding the amounts of noise to the set of top k+1 true sub-counts; and when a noisy sub-count of the set of noisy top k+1 sub-counts is greater than a threshold, including the noisy sub-count in a set of at most k noisy sub-counts; and including the set of at most k noisy sub-counts in the noisy count breakdown. An example 20 includes the subject matter of example 19, where the at least one processor, when executing the instructions, is capable of performing operations further including: determining that the total number of possible values of the attribute is variable; and determining that the instance changes more than one sub-count of the set of sub-counts.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A method comprising:
receiving a data stream comprising instances of count data collected over a time interval;
an instance of the count data represents an occurrence of a user interface interaction with a post;
the post is associated with an account in an online system;
using the count data, computing a true count breakdown comprising a set of sub-counts of non-public user interface interactions on the post;
wherein at least one of the sub-counts is a count associated with a particular value of an attribute that has a plurality of different possible values and the attribute is associated with the non-public user interface interactions on the post;
creating a noisy count breakdown by applying at least one differential privacy mechanism to the set of sub-counts;
wherein applying the at least one differential privacy mechanism to the set of sub-counts comprises:

creating a simulation of a binary table for each value of the plurality of different possible values of the attribute;

using the simulations of the binary tables, determining amounts of noise to be added to the set of sub-counts;

selecting, from the set of sub-counts, a set of top k true sub-counts;

k is a positive integer less than a total number of possible values of the attribute;

determining a set of noisy top k sub-counts by adding the amounts of noise to each true sub-count of the set of top k true sub-counts;

selecting, from the set of noisy top k sub-counts, at least one noisy sub-count that is greater than a threshold; and including the selected at least one noisy sub-count in the noisy count breakdown; and streaming the noisy count breakdown instead of the true count breakdown to a computing device associated with the account.

2. The method of claim 1, further comprising:
in response to a page load request from the computing device, displaying the noisy count breakdown on a user interface of the computing device.

3. The method of claim 2, further comprising:
creating a new version of the noisy count breakdown and, in response to a page refresh request from the computing device, displaying the new version of the noisy count breakdown on the user interface of the computing device.

4. The method of claim 1, further comprising:
determining a value of at least one data privacy parameter;
selecting a differential privacy mechanism based on the value; and
computing the threshold using the value and the selected differential privacy mechanism.

5. The method of claim 4, further comprising:
determining that the number of different possible values of the attribute is variable; and
determining that the user interface interaction associated with the instance changes at most one sub-count of the set of sub-counts.

6. The method of claim 1, further comprising:
determining that the total number of possible values of the attribute is fixed; and
determining that the instance changes more than one sub-count of the set of sub-counts.

7. The method of claim 1, wherein applying the at least one differential privacy mechanism to the set of sub-counts further comprises:
selecting, from the set of sub-counts, a set of top k+1 true sub-counts;
determining a set of noisy top k+1 sub-counts by adding the amounts of noise to the set of top k+1 true sub-counts; and
when a noisy sub-count of the set of noisy top k+1 sub-counts is greater than a threshold, including the noisy sub-count in a set of at most k noisy sub-counts; and
including the set of at most k noisy sub-counts in the noisy count breakdown.

8. The method of claim 7, further comprising:
determining that the total number of possible values of the attribute is variable; and
determining that the instance changes more than one sub-count of the set of sub-counts.

9. A system comprising:
at least one memory comprising instructions; and
at least one processor coupled to the at least one memory;
wherein the at least one processor, when executing the instructions, is capable of performing operations comprising:
receiving a data stream comprising instances of count data collected over a time interval;
an instance of the count data represents an occurrence of a user interface interaction with a post;
the post is associated with an account in an online system;
using the count data, computing a true count breakdown comprising a set of sub-counts of non-public user interface interactions on the post;
wherein at least one of the sub-counts is a count associated with a particular value of an attribute that has a plurality of different possible values and the attribute is associated with the non-public user interface interactions on the post;
creating a noisy count breakdown by applying at least one differential privacy mechanism to the set of sub-counts;
creating a simulation of a binary table for each value of the plurality of different possible values of the attribute;
using the simulations of the binary tables, determining amounts of noise to be added to the set of sub-counts;
selecting, from the set of sub-counts, a set of top k true sub-counts;
k is a positive integer less than a total number of possible values of the attribute;
determining a set of noisy top k sub-counts by adding the amounts of noise to each true sub-count of the set of top k true sub-counts;
selecting, from the set of noisy top k sub-counts, at least one noisy sub-count that is greater than a threshold;
including the selected at least one noisy sub-count in the noisy count breakdown; and
streaming the noisy count breakdown instead of the true count breakdown to a computing device associated with the account.

10. The system of claim 9, wherein the at least one processor, when executing the instructions, is capable of performing operations further comprising:
in response to a page load request from the computing device, displaying the noisy count breakdown on a user interface of the computing device.

11. The system of claim 9, wherein the at least one processor, when executing the instructions, is capable of performing operations further comprising:
creating a new version of the noisy count breakdown and, in response to a page refresh request from the computing device, displaying the new version of the noisy count breakdown on the user interface of the computing device.

12. The system of claim 9, wherein the at least one processor, when executing the instructions, is capable of performing operations further comprising:
determining a value of at least one data privacy parameter;
selecting a differential privacy mechanism based on the value;
computing the threshold using the value and the selected differential privacy mechanism;
determining that the number of different possible values of the attribute is variable; and
determining that the user interface interaction associated with the instance changes at most one sub-count of the set of sub-counts.

13. The system of claim 9, wherein the at least one processor, when executing the instructions, is capable of performing operations further comprising:
- determining that the total number of possible values of the attribute is fixed; and
- determining that the instance changes more than one sub-count of the set of sub-counts.

14. The system of claim 9, wherein the at least one processor, when executing the instructions, is capable of performing operations further comprising:
- selecting, from the set of sub-counts, a set of top k+1 true sub-counts;
- determining a set of noisy top k+1 sub-counts by adding the amounts of noise to the set of top k+1 true sub-counts; and
- when a noisy sub-count of the set of noisy top k+1 sub-counts is greater than a threshold, including the noisy sub-count in a set of at most k noisy sub-counts; and
- including the set of at most k noisy sub-counts in the noisy count breakdown.

15. The system of claim 14, wherein the at least one processor, when executing the instructions, is capable of performing operations further comprising:
- determining that the total number of possible values of the attribute is variable; and
- determining that the instance changes more than one sub-count of the set of sub-counts.

* * * * *